(12) United States Patent
Moriura et al.

(10) Patent No.: US 12,066,337 B2
(45) Date of Patent: Aug. 20, 2024

(54) LOAD SENSOR

(71) Applicant: Panasonic Intellectual Property Management Co., Ltd., Osaka (JP)

(72) Inventors: Yuta Moriura, Osaka (JP); Hironobu Ukitsu, Osaka (JP); Susumu Uragami, Osaka (JP); Takashi Matsumoto, Osaka (JP); Hiroyuki Furuya, Osaka (JP); Akira Ito, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 327 days.

(21) Appl. No.: 17/709,722

(22) Filed: Mar. 31, 2022

(65) Prior Publication Data
US 2022/0221351 A1    Jul. 14, 2022

Related U.S. Application Data

(63) Continuation of application No. PCT/JP2020/038205, filed on Oct. 8, 2020.

(30) Foreign Application Priority Data

Oct. 15, 2019   (JP) ................................ 2019-188875

(51) Int. Cl.
   *G01L 1/14*   (2006.01)
(52) U.S. Cl.
   CPC .................... *G01L 1/144* (2013.01)
(58) Field of Classification Search
   CPC ................ G01L 1/144; G01L 1/146
   See application file for complete search history.

(56) References Cited

U.S. PATENT DOCUMENTS

| 10,365,172 | B2 * | 7/2019 | Tomita | ................... B25J 13/084 |
| 2013/0152705 | A1 * | 6/2013 | Moon | ....................... G01L 1/14 |
| | | | | 73/862.626 |
| 2016/0283007 | A1 | 9/2016 | Ogura et al. | |
| 2018/0188873 | A1 * | 7/2018 | Cheng | ................... G01L 9/0051 |
| 2019/0277713 | A1 * | 9/2019 | Moriura | .................. G01L 1/146 |
| 2022/0163414 | A1 * | 5/2022 | Aihara | ..................... G01L 1/146 |

FOREIGN PATENT DOCUMENTS

| GB | 2443208 A | 4/2008 |
| JP | 2000-162055 A | 6/2000 |
| JP | 2016-183956 A | 10/2016 |
| JP | 2018-115873 A | 7/2018 |
| WO | 2018/096901 A1 | 5/2018 |

OTHER PUBLICATIONS

International Search Report for International Patent Application PCT/JP2020/038205, mailed Nov. 10, 2020. 5 pages, Japan Patent Office, w/English translation.

* cited by examiner

*Primary Examiner* — Francis C Gray
(74) *Attorney, Agent, or Firm* — Rimon P.C.

(57) ABSTRACT

A load sensor includes: a base member being insulative and having elasticity; an electrode having elasticity and formed on an upper face of the base member; and a wire member being electrically conductive and disposed so as to be superposed on an upper face of the electrode, a surface of the wire member being covered by a dielectric body. A ratio of a thickness of the electrode to a thickness of the base member is not less than 0.02 and not greater than 0.3.

13 Claims, 20 Drawing Sheets

FIG. 1A  EMBODIMENT 1
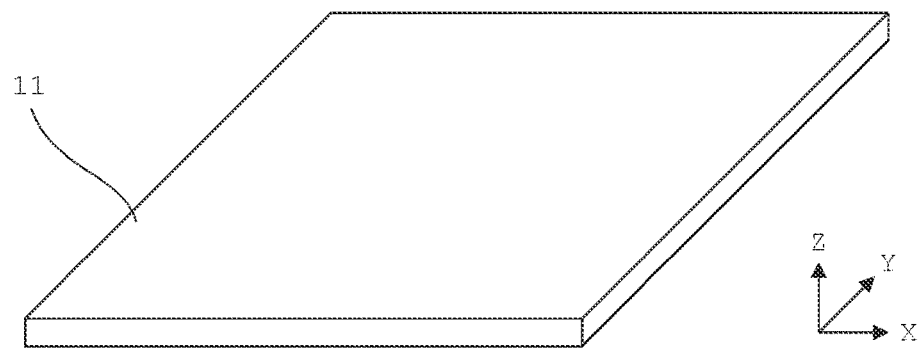
FIG. 1B
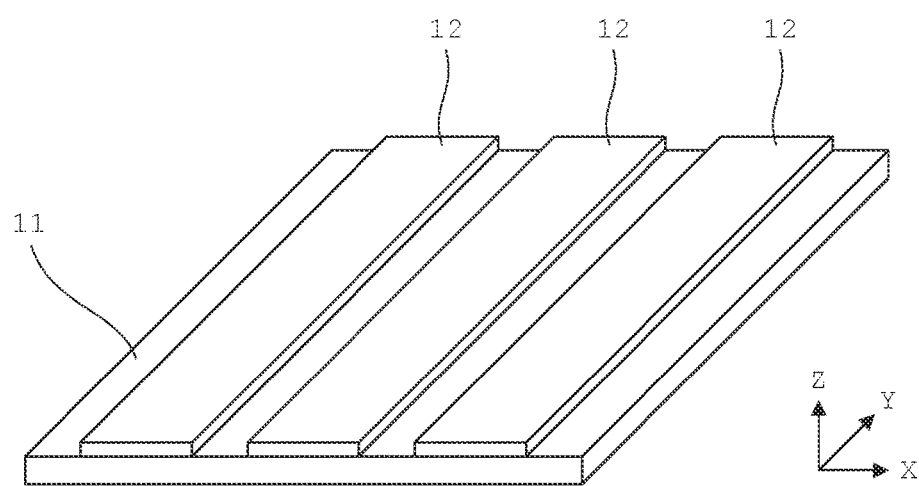
FIG. 1C
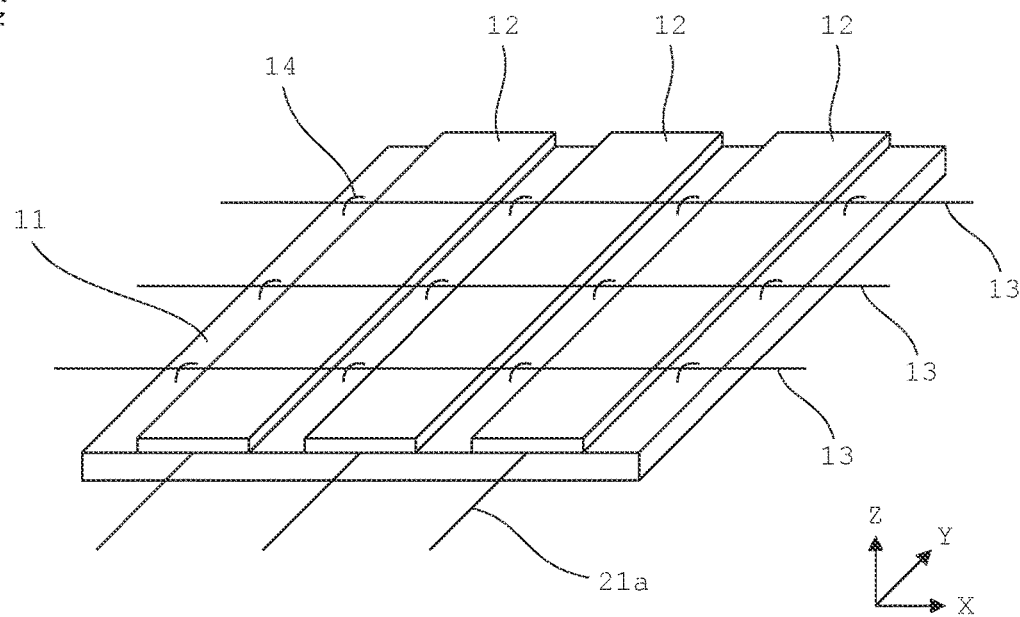

FIG.3A  SCREEN PRINTING
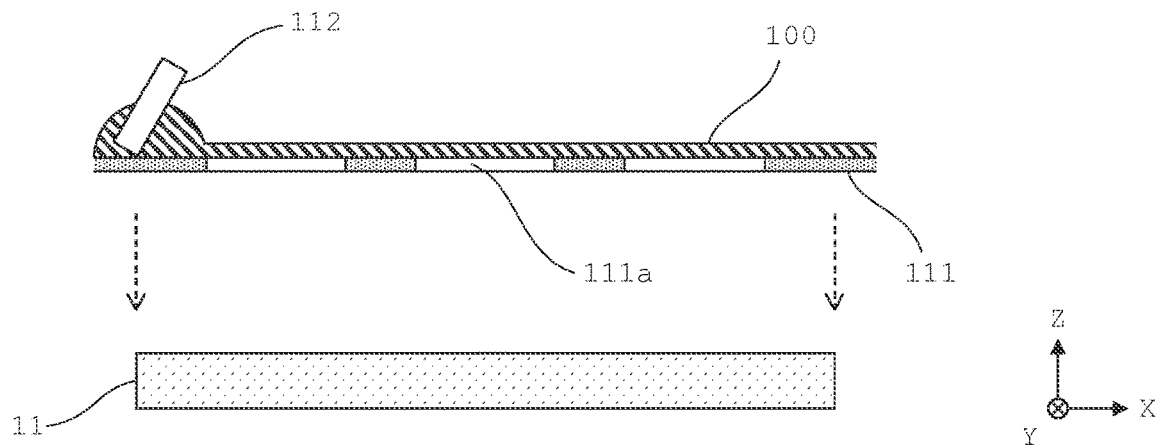
FIG.3B
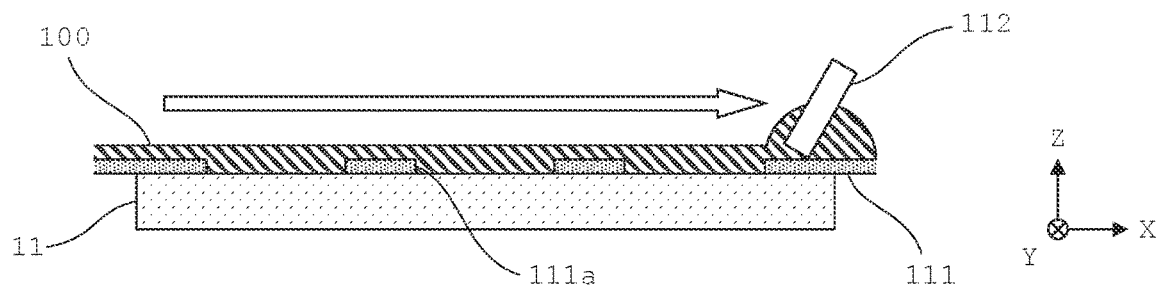
FIG.3C
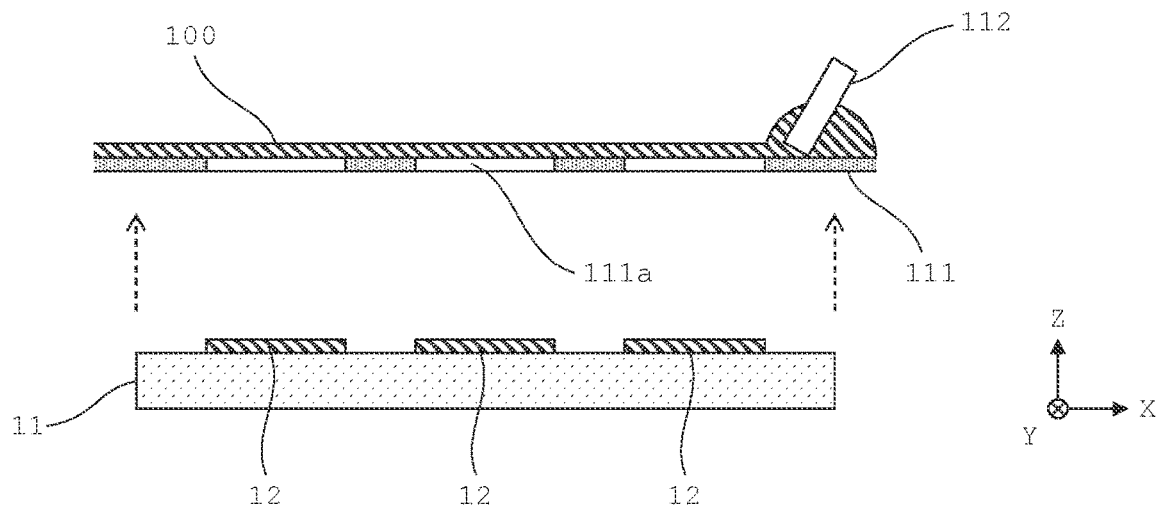

FIG. 4  GRAVURE PRINTING
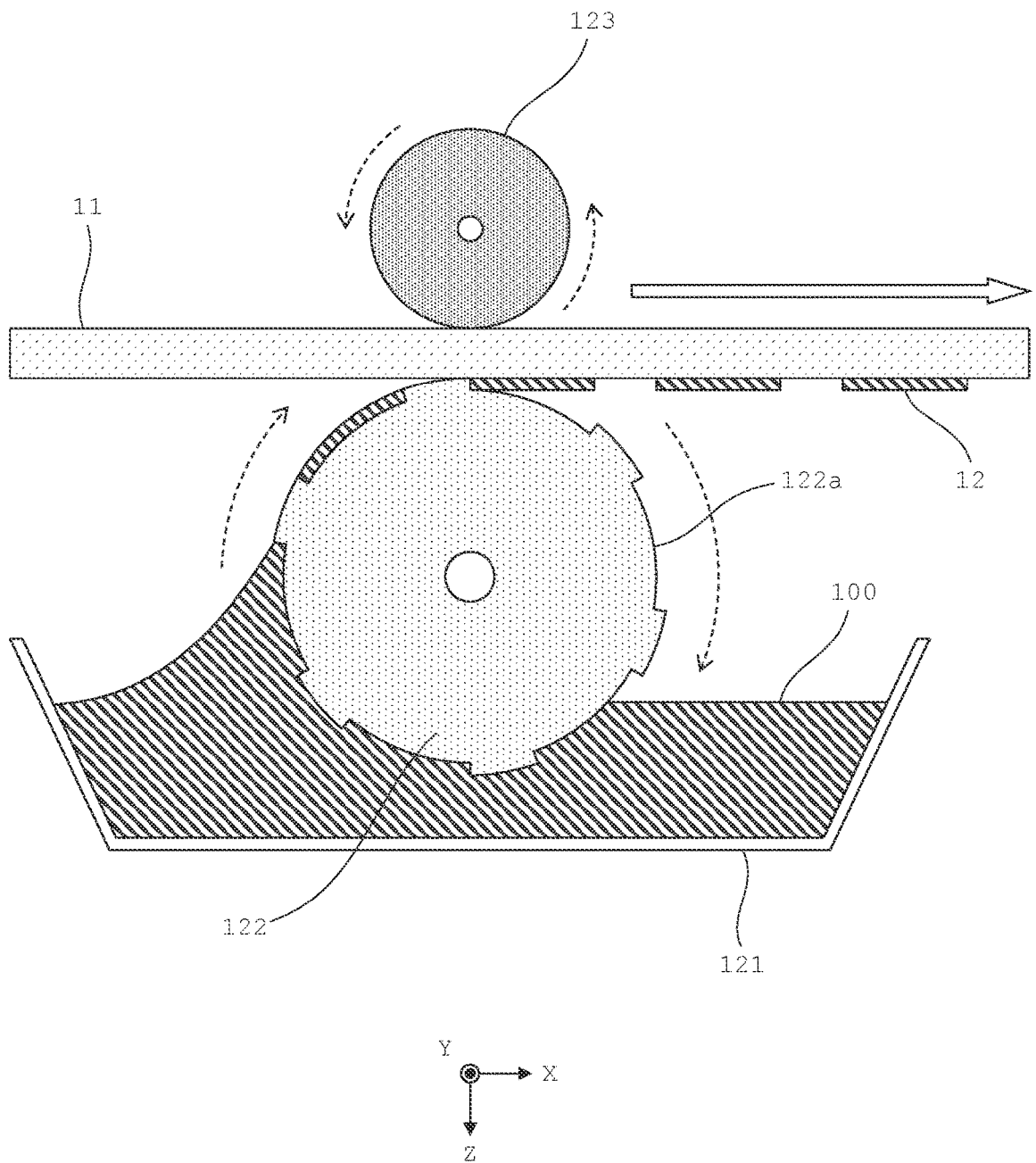

FIG.5    FLEXOGRAPHIC PRINTING
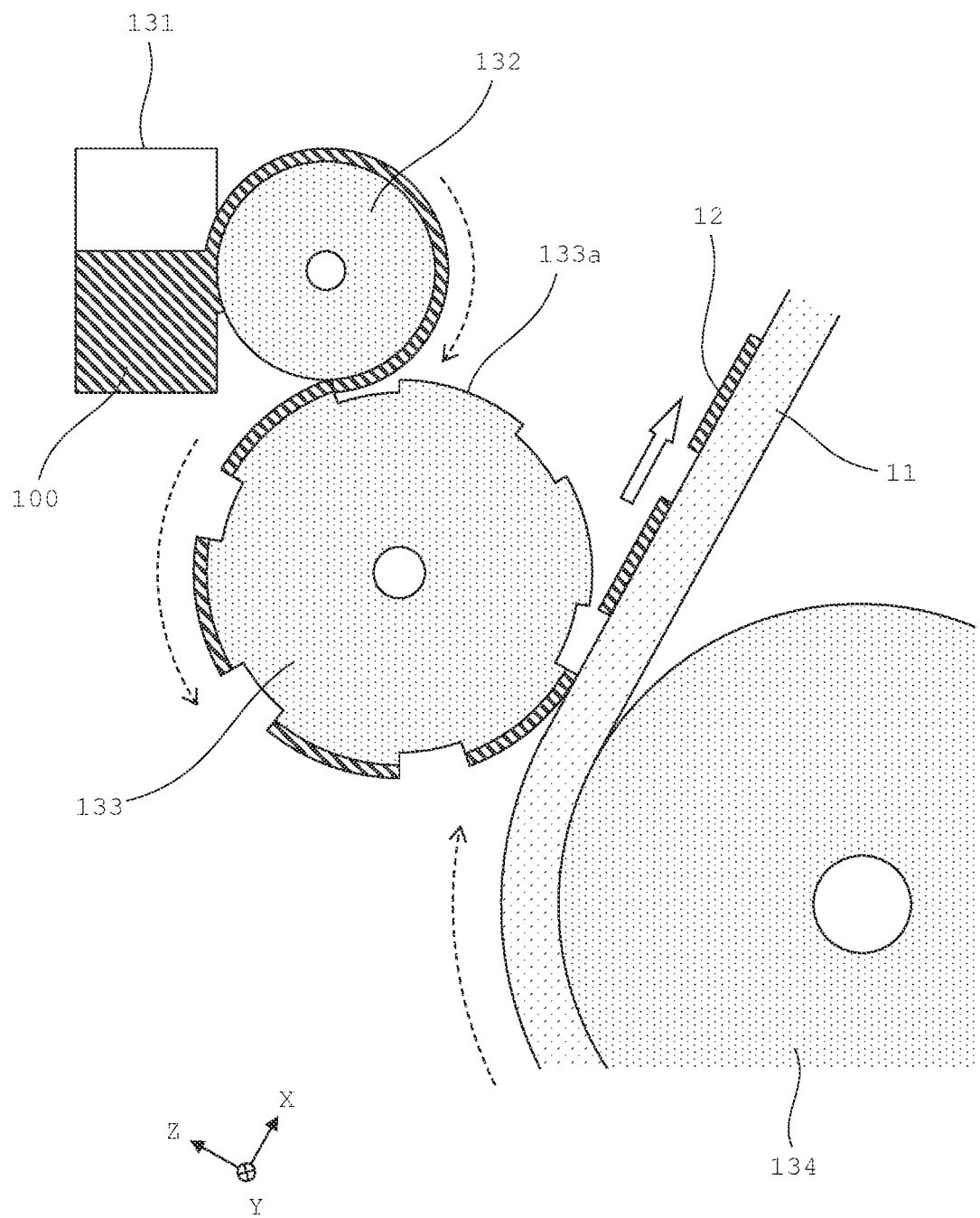

FIG. 6   OFFSET PRINTING
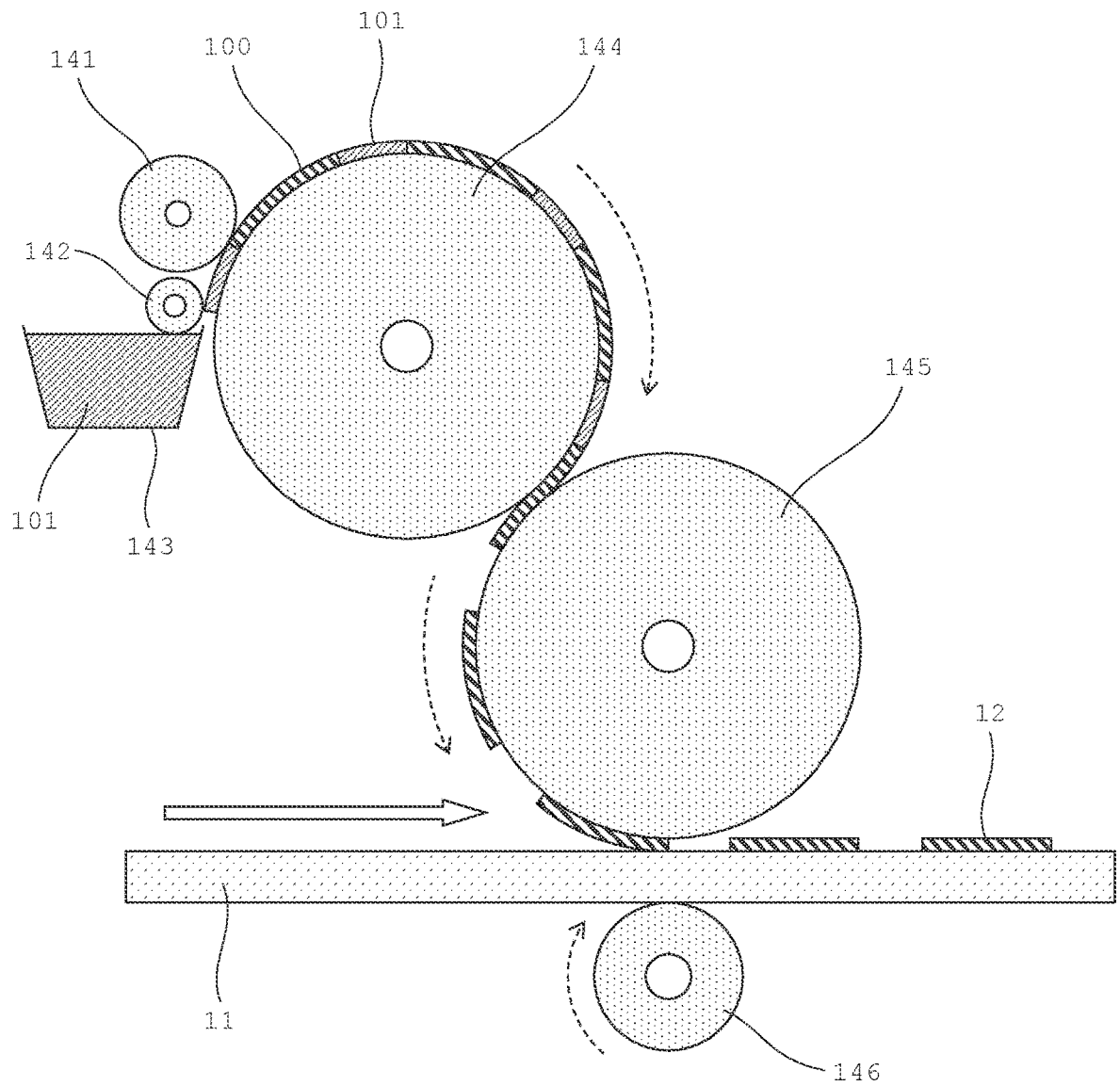

FIG. 7    GRAVURE OFFSET PRINTING
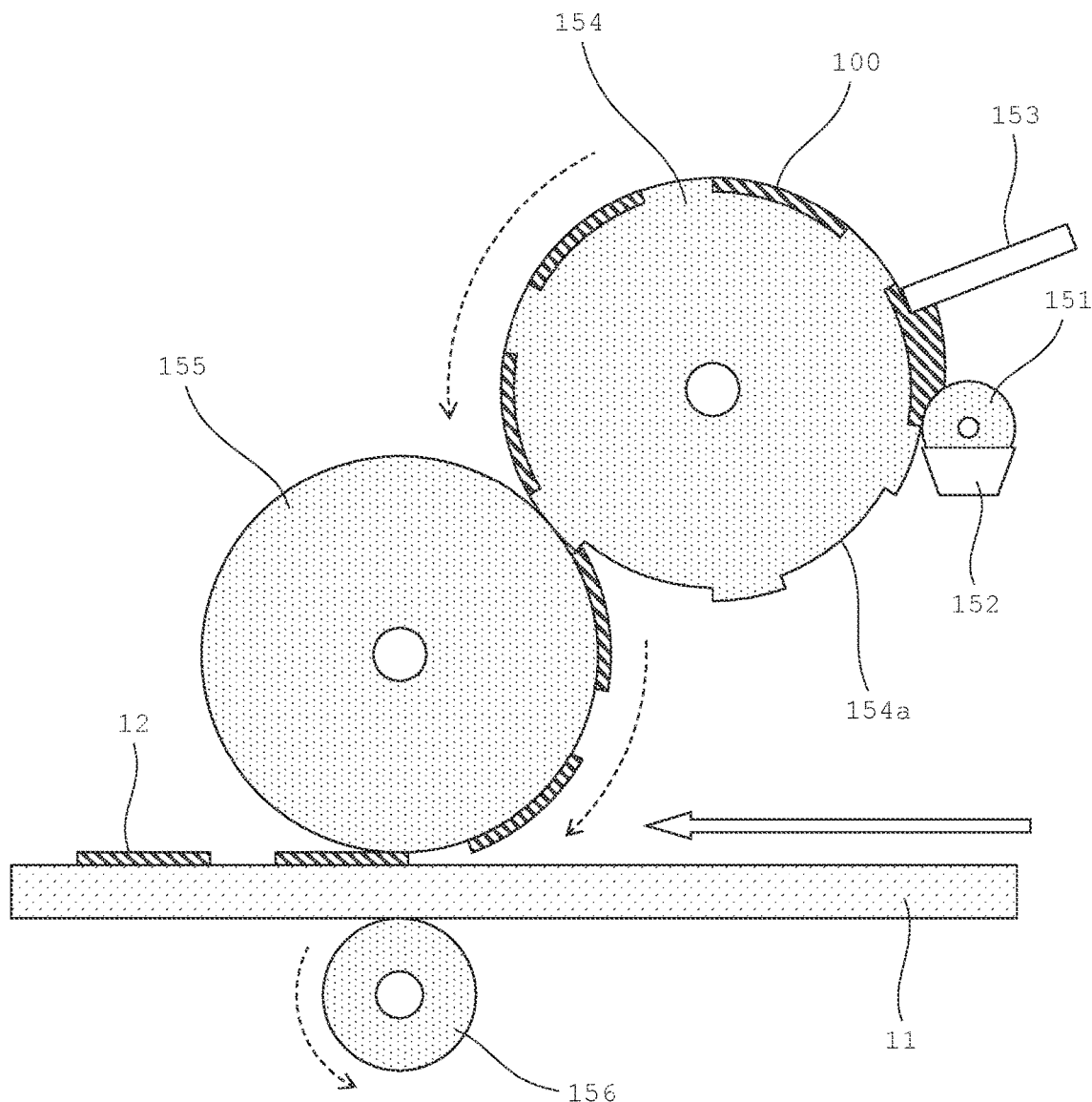

FIG.10A
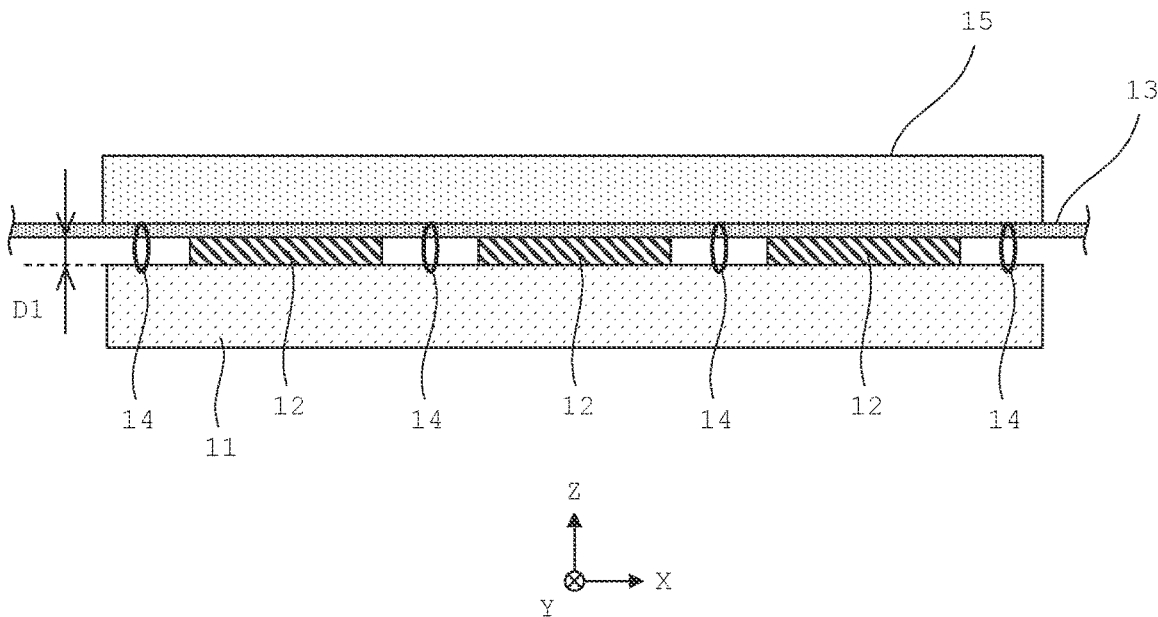
FIG.10B  COMPARATIVE EXAMPLE
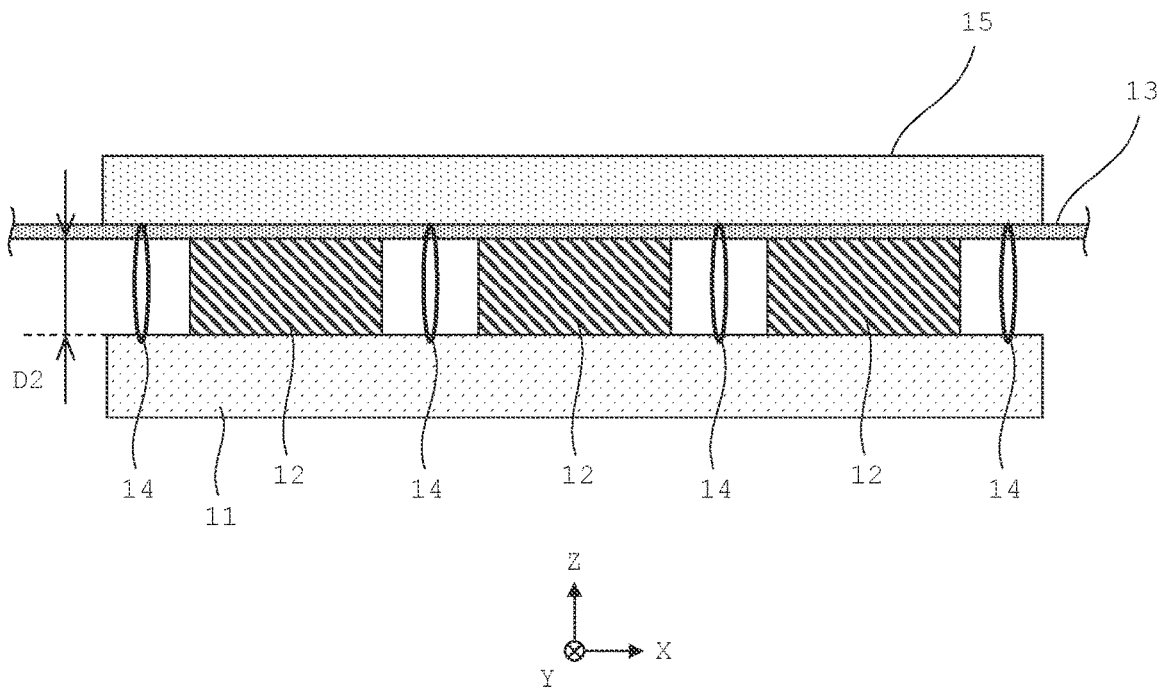

FIG.12  EMBODIMENT 2

FIG. 15A   EXPERIMENT: COMPARATIVE EXAMPLE
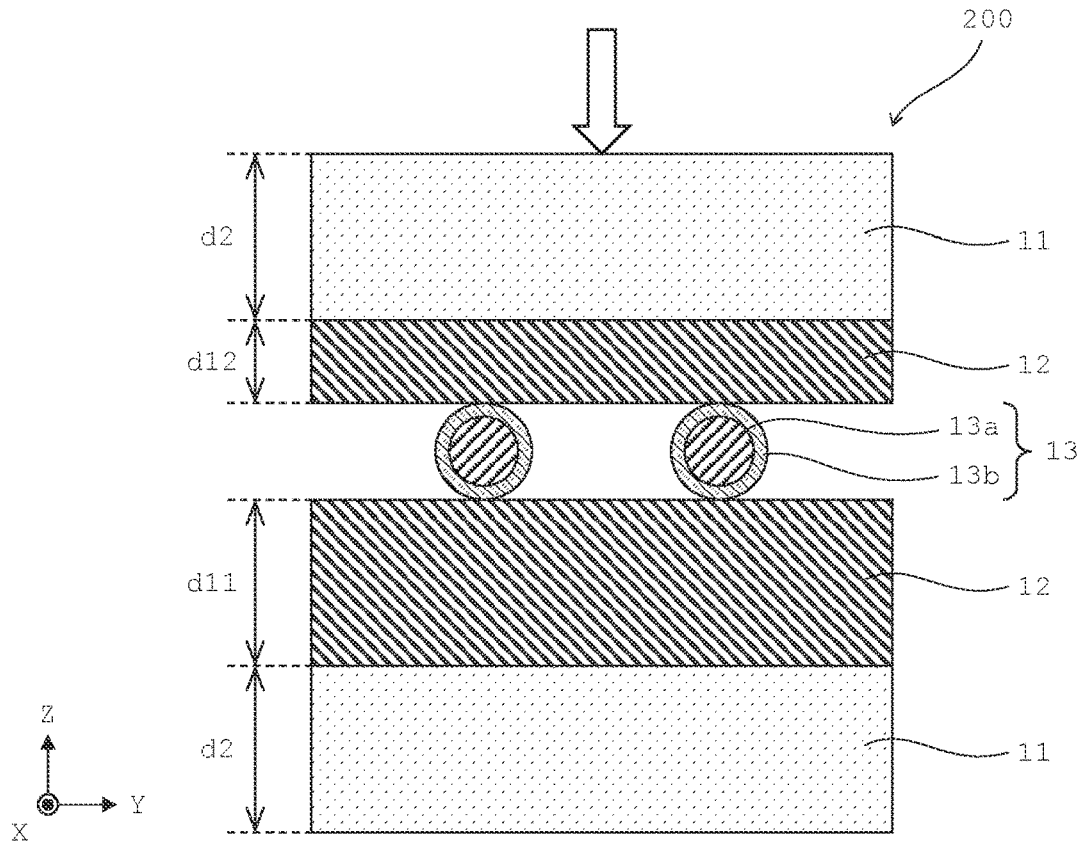
FIG. 15B   EXPERIMENT: EMBODIMENT 2
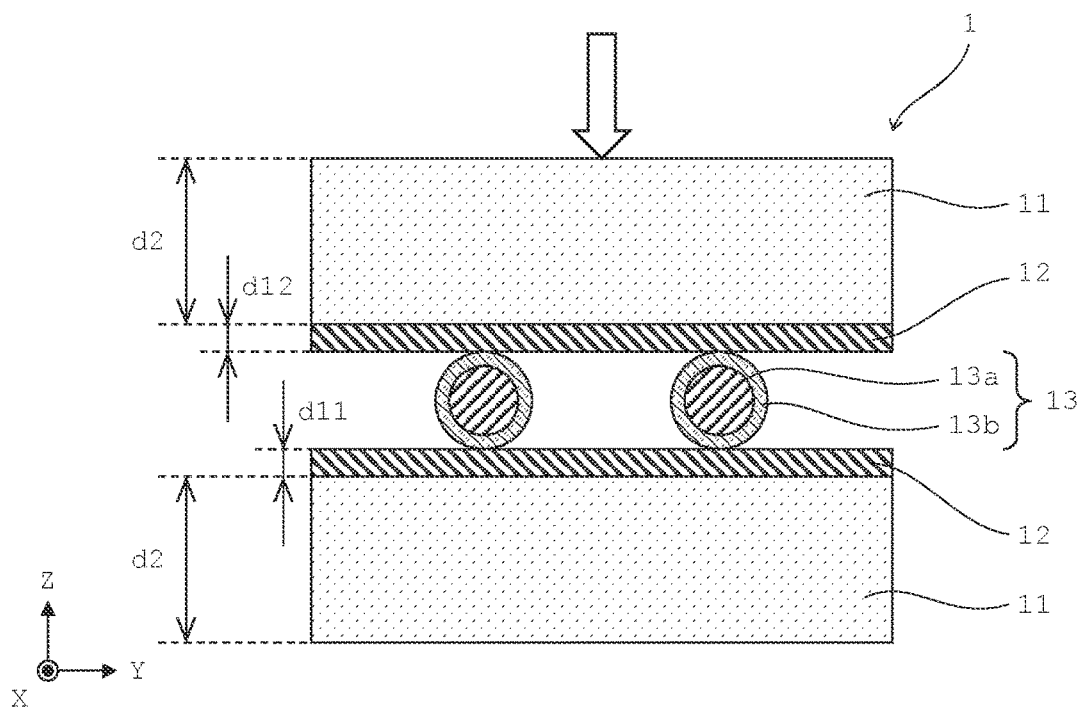

FIG. 16A  EXPERIMENT: COMPARATIVE EXAMPLE
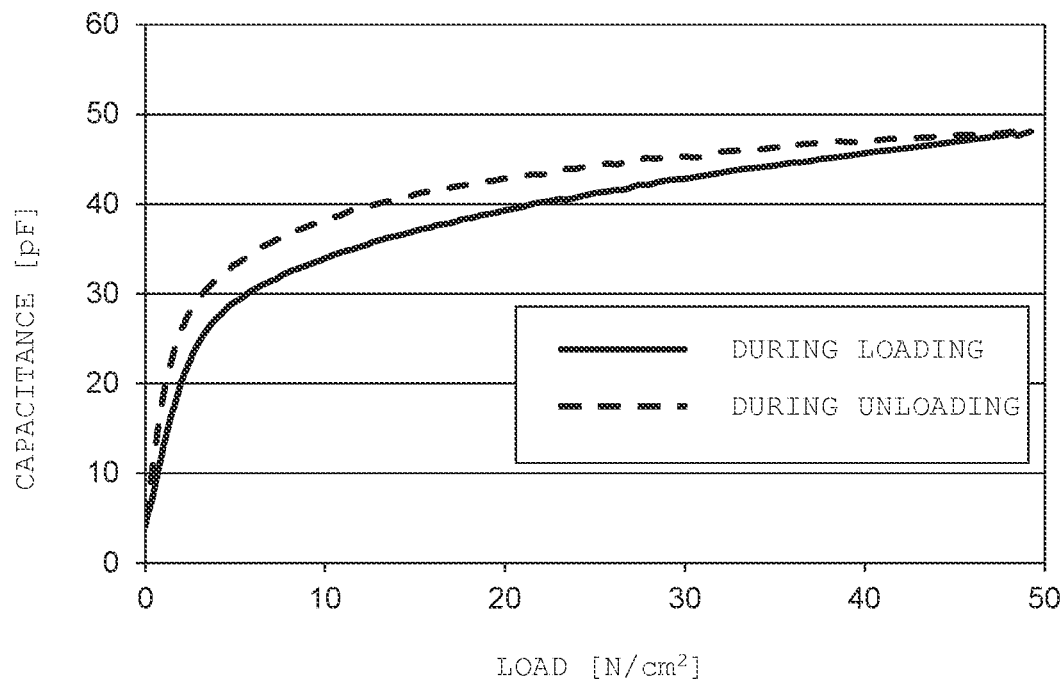
FIG. 16B  EXPERIMENT: EMBODIMENT 2
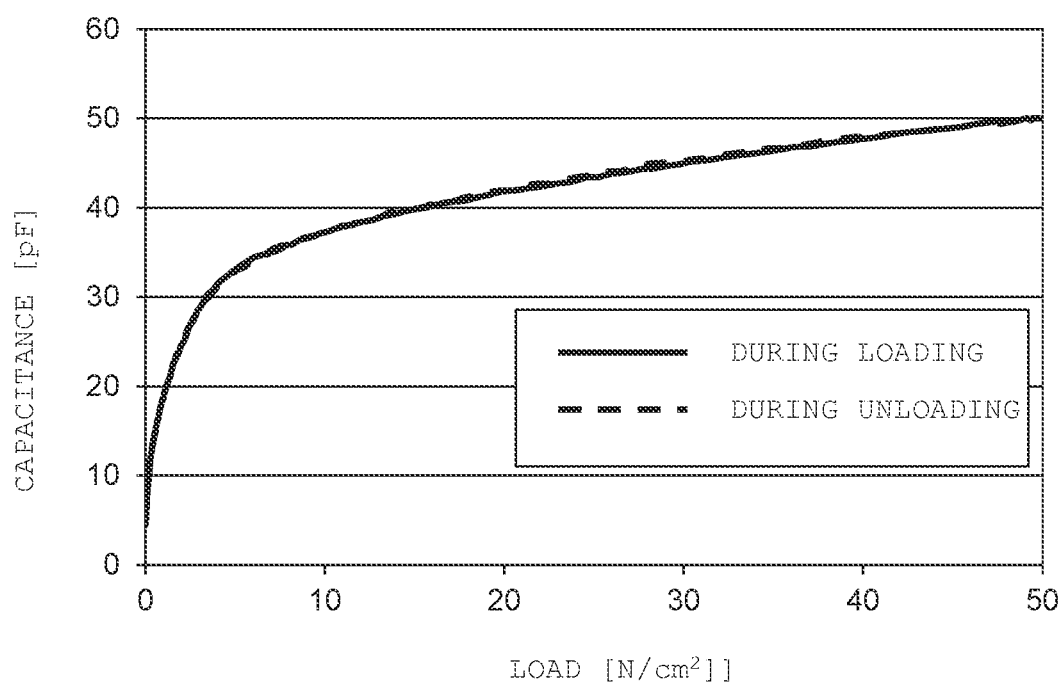

FIG.19  EMBODIMENT 3
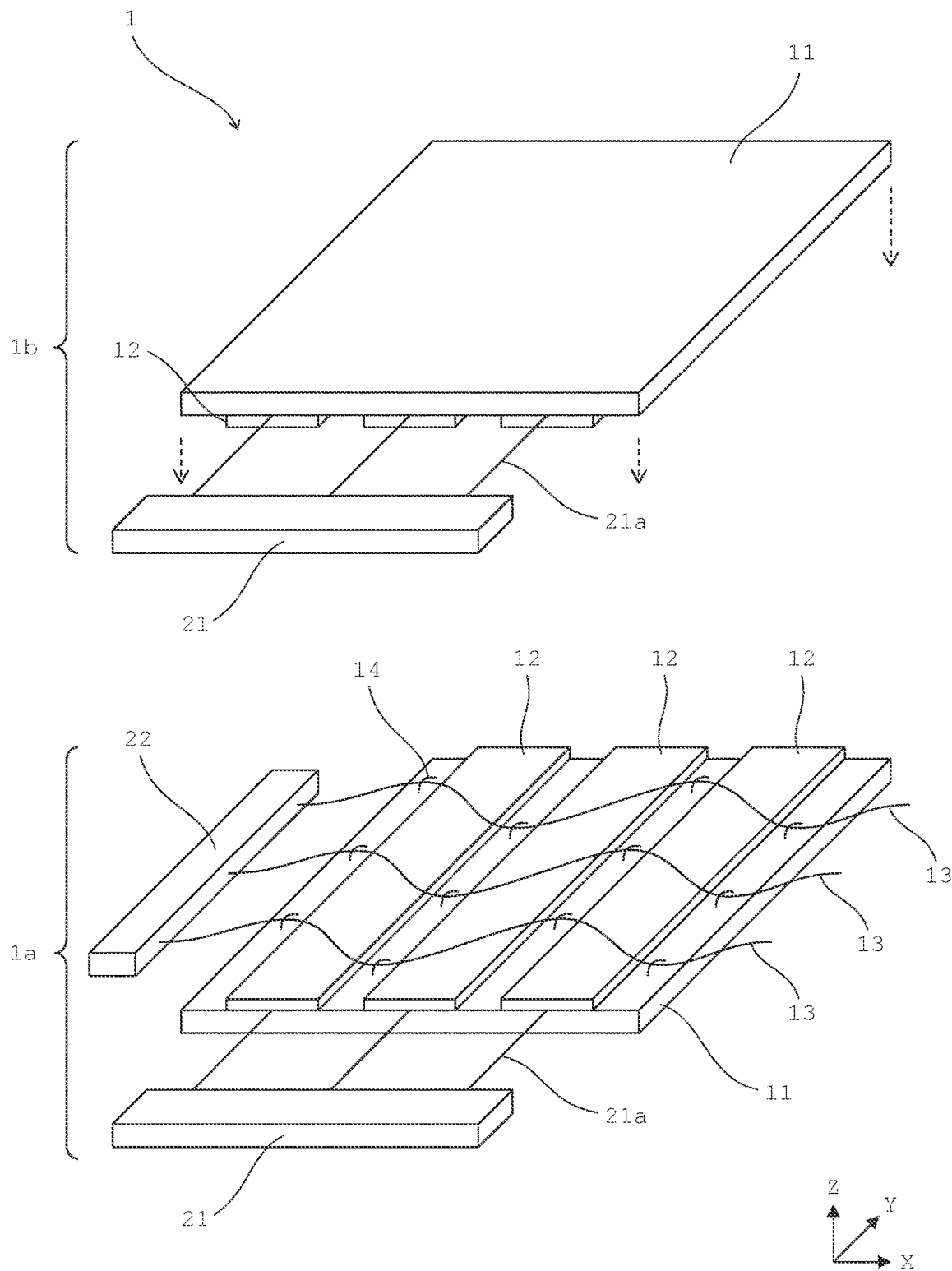

LOAD SENSOR

CROSS REFERENCE TO RELATED APPLICATIONS

This application is a continuation of International Application No. PCT/JP2020/038205 filed on Oct. 8, 2020, entitled "LOAD SENSOR", which claims priority under 35 U.S.C. Section 119 of Japanese Patent Application No. 2019-188875 filed on Oct. 15, 2019, entitled "LOAD SENSOR AND MANUFACTURING METHOD OF LOAD SENSOR". The disclosures of the above applications are incorporated herein by reference.

BACKGROUND OF THE INVENTION

1. Field of the Invention

The present invention relates to a load sensor that detects a load applied from outside, on the basis of change in capacitance.

2. Disclosure of Related Art

Load sensors are widely used in the fields of industrial apparatuses, robots, vehicles, and the like. In recent years, in accordance with advancement of control technologies by computers and improvement of design, development of electronic apparatuses that use a variety of free-form surfaces such as those in human-form robots and interior equipment of automobiles is in progress. In association therewith, it is required to mount a high performance load sensor to each free-form surface.

International Publication No. WO2018/096901 describes a pressure-sensitive element that includes: a pressure-sensitive part to which a pressing force is applied; and a detector that detects the pressing force. In this pressure-sensitive element, the pressure-sensitive part includes: a first electrically-conductive member; a second electrically-conductive member; and a dielectric body. The first electrically-conductive member has elasticity. The dielectric body is disposed between the first electrically-conductive member and the second electrically-conductive member, and at least partially covers a surface of the first electrically-conductive member or a surface of the second electrically-conductive member. The detector detects a pressing force on the basis of change in capacitance between the first electrically-conductive member and the second electrically-conductive member.

In the load sensor as described above, between during loading and during unloading, property deviation (hysteresis) occurs in the change in the capacitance. The electrically-conductive member having elasticity is a member that is provided with electrical conductivity by a filler being added to an elastic body such as rubber. When a filler is added into the rubber, the filler serves as an inhibitive factor against elastic return of the electrically-conductive member, whereby the response of elastic return is impaired. Because of this, changes in the capacitance during loading and during unloading are deviated from each other. Thus, even when the loads have the same value, the values of the capacitance become different between during loading and during unloading, thus causing deviation between the detection values of the load sensor.

SUMMARY OF THE INVENTION

A main mode of the present invention relates to a load sensor. The load sensor according to the present mode 1 includes: a base member being insulative and having elasticity; an electrode having elasticity and formed on an upper face of the base member; and a wire member being electrically conductive and disposed so as to be superposed on an upper face of the electrode, a surface of the wire member being covered by a dielectric body. Here, a ratio of a thickness of the electrode to a thickness of the base member is not less than 0.02 and not greater than 0.3.

According to the load sensor of the present mode, when the ratio of the thickness of the electrode to the thickness of the base member is set to be not less than 0.02 and not greater than 0.3, the thickness of the electrode can be made sufficiently smaller than the thickness of the base member. Accordingly, in deformations of the electrode and the base member during loading and during unloading, influence of the deformation of the electrode is suppressed, and influence of the deformation of the base member becomes dominant. Therefore, influence of response impairment in elastic return of the electrode can be suppressed, and as a result, changes in capacitance during loading and during unloading can be caused to substantially match each other. Therefore, deviation between the detection values of the load sensor during loading and during unloading can be suppressed.

BRIEF DESCRIPTION OF THE DRAWINGS

FIG. 1A to FIG. 1C are each a perspective view schematically showing a configuration of each part of a load sensor according to Embodiment 1;

FIG. 3A to FIG. 3C are each a schematic diagram for describing screen printing according to Embodiment 1;

FIG. 4 is a schematic diagram for describing gravure printing according to Embodiment 1;

FIG. 5 is a schematic diagram for describing flexographic printing according to Embodiment 1;

FIG. 6 is schematic diagram for describing offset printing according to Embodiment 1;

FIG. 7 is a schematic diagram for describing gravure offset printing according to Embodiment 1;

FIG. 10A is a schematic diagram obtained when the load sensor cut, at a position of a wire, along a plane parallel to an X-Z plane is viewed in a Y-axis positive direction, according to Embodiment 1;

FIG. 10B is a schematic diagram obtained when a load sensor cut, at a position of a wire, along a plane parallel to an X-Z plane is viewed in the Y-axis positive direction, according to a comparative example of Embodiment 1;

FIG. 15A is a cross-sectional view schematically showing the periphery of wires when viewed in the X-axis negative direction, according to a comparative example of Embodiment 2;

FIG. 15B is a cross-sectional view schematically showing the periphery of wires when viewed in the X-axis negative direction, according to Embodiment 2;

FIG. 16A is a graph showing a relationship between load and capacitance according to the comparative example of Embodiment 2;

FIG. 16B is a graph showing a relationship between load and capacitance according to Embodiment 2;

FIG. 19 is a perspective view schematically showing a configuration of each part of a load sensor according to Embodiment 3.

Figure 2A:
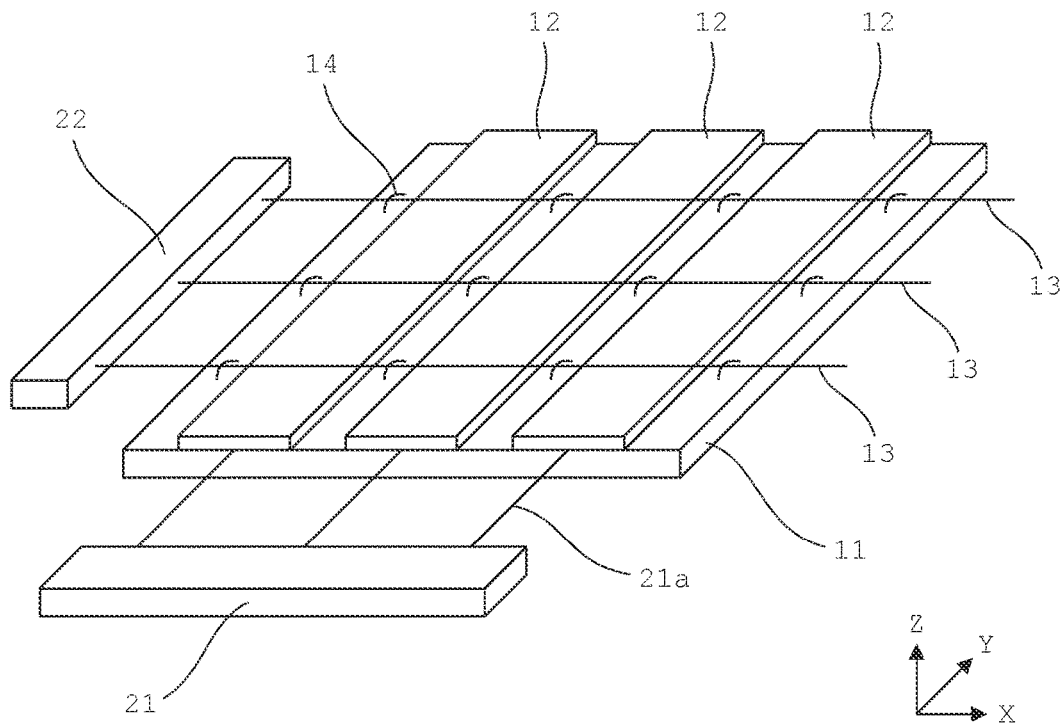
FIG. 2A is a perspective view schematically showing a configuration of each part of the load sensor according to Embodiment 1.

It should be noted that the drawings are solely for description and do not limit the scope of the present invention in any way.

DESCRIPTION OF PREFERRED EMBODIMENTS

The present invention is applicable to a load sensor of a management system or an electronic apparatus that performs processing in accordance with an applied load.

Examples of the management system include a stock management system, a driver monitoring system, a coaching management system, a security management system, and a caregiving/nursing management system.

In the stock management system, for example, by a load sensor provided to a stock shelf, the load of a placed stock is detected, and the kinds of commodities and the number of commodities present on the stock shelf are detected. Accordingly, in a store, a factory, a warehouse, and the like, the stock can be efficiently managed, and manpower saving can be realized. In addition, by a load sensor provided in a refrigerator, the load of food in the refrigerator is detected, and the kinds of the food and the quantity and amount of the food in the refrigerator are detected. Accordingly, a menu that uses food in a refrigerator can be automatically proposed.

In the driver monitoring system, by a load sensor provided to a steering device, the distribution of a load (e.g., gripping force, grip position, tread force) applied on the steering device by a driver is monitored, for example. In addition, by a load sensor provided to a vehicle-mounted seat, the distribution of a load (e.g., the position of the center of gravity) applied on the vehicle-mounted seat by the driver in a seated state is monitored. Accordingly, the driving state (sleepiness, mental state, and the like) of the driver can be fed back.

In the coaching management system, for example, by a load sensor provided to the bottom of a shoe, the load distribution at a sole is monitored. Accordingly, correction or leading to an appropriate waking state or running state can be realized.

In the security management system, for example, by a load sensor provided to a floor, the load distribution is detected when a person passes, and the body weight, stride, passing speed, shoe sole pattern, and the like are detected. Accordingly, the person who has passed can be identified by checking these pieces of detection information against data.

In the caregiving/nursing management system, for example, by load sensors provided to bedclothes and a toilet seat, the distributions of loads applied by a human body onto the bedclothes and the toilet seat are monitored. Accordingly, at the positions of the bedclothes and the toilet seat, what action the person is going to take is estimated, whereby tumbling or falling can be prevented.

Examples of the electronic apparatus include a vehicle-mounted apparatus (car navigation system, audio apparatus, etc.), a household electrical appliance (electric pot, IH cooking heater, etc.), a smartphone, an electronic paper, an electronic book reader, a PC keyboard, a game controller, a smartwatch, a wireless earphone, a touch panel, an electronic pen, a penlight, lighting clothes, and a musical instrument. In an electronic apparatus, a load sensor is provided to an input part that receives an input from a user.

The embodiments below are of load sensors that are typically provided in a management system or an electronic apparatus as described above. Such a load sensor may be referred to as a "capacitance-type pressure-sensitive sensor element", a "capacitive pressure detection sensor element", a "pressure-sensitive switch element", or the like. The embodiments below are examples of embodiments of the present invention, and the present invention is not limited to the embodiments below in any way.

Hereinafter, embodiments of the present invention will be described with reference to the drawings. For convenience, X-, Y-, and Z-axes orthogonal to each other are provided in the drawings. The Z-axis direction is the height direction of a load sensor 1.

Embodiment 1

With reference to FIG. 1A to FIG. 2B, a manufacturing method of the load sensor 1 of Embodiment 1 is described. FIG. 1A to FIG. 2B are each a perspective view schematically showing a configuration of each part of the load sensor 1.

As shown in FIG. 1A, a base member 11 is an insulative member having elasticity. The base member 11 has a flat plate shape parallel to an X-Y plane.

The base member 11 is formed from a non-electrically-conductive resin material or a non-electrically-conductive rubber material. The resin material used in the base member 11 is a resin material of at least one type selected from the group consisting of a styrene-based resin, a silicone-based resin (e.g., polydimethylpolysiloxane (PDMS)), an acrylic resin, a rotaxane-based resin, a urethane-based resin, and the like, for example. The rubber material used in the base member 11 is a rubber material of at least one type selected from the group consisting of silicone rubber, isoprene rubber, butadiene rubber, styrene-butadiene rubber, chloroprene rubber, nitrile rubber, polyisobutylene, ethylene-propylene rubber, chlorosulfonated polyethylene, acrylic rubber, fluororubber, epichlorohydrin rubber, urethane rubber, natural rubber, and the like, for example.

Subsequently, on the upper face (the face on the Z-axis positive side) of the base member 11 shown in FIG. 1A, electrodes 12 are formed as shown in FIG. 1B. Here, three electrodes 12 are formed on the upper face of the base member 11. Each electrode 12 is an electrically-conductive member having elasticity. The electrodes 12 each have a band-like shape that is long in the Y-axis direction on the upper face of the base member 11, and are formed so as to be separated from each other. Each electrode 12 is formed from a resin material and an electrically-conductive filler dispersed therein, or from a rubber material and an electrically-conductive filler dispersed therein.

Similar to the resin material used in the base member 11 described above, the resin material used in the electrode 12 is a resin material of at least one type selected from the group consisting of a styrene-based resin, a silicone-based resin (polydimethylpolysiloxane (e.g., PDMS)), an acrylic resin, a rotaxane-based resin, a urethane-based resin, and the like, for example. Similar to the rubber material used in the base member 11 described above, the rubber material used in the electrode 12 is a rubber material of at least one type selected from the group consisting of silicone rubber, isoprene rubber, butadiene rubber, styrene-butadiene rubber, chloroprene rubber, nitrile rubber, polyisobutylene, ethylene-propylene rubber, chlorosulfonated polyethylene, acrylic rubber, fluororubber, epichlorohydrin rubber, urethane rubber, natural rubber, and the like, for example.

The electrically-conductive filler used in the electrode 12 is a material of at least one type selected from the group consisting of: metal materials such as Au (gold), Ag (silver), Cu (copper), C (carbon), ZnO (zinc oxide), $In_2O_3$ (indium oxide (III)), and $SnO_2$ (tin oxide (IV)); electrically-conductive macromolecule materials such as PEDOT:PSS (i.e., a complex composed of poly(3,4-ethylenedioxythiophene) (PEDOT) and polystyrene sulfonate (PSS)); electrically-conductive fibers such as a metal-coated organic matter fiber and a metal wire (fiber state); and the like, for example.

Each electrode 12 is formed by a predetermined printing method on the upper face of the base member 11. The printing method for forming the electrode 12 will be described later with reference to FIG. 3A to FIG. 7.

Subsequently, wires 13 are disposed so as to be superposed on the upper faces of the three electrodes 12 shown in FIG. 1B. Here, three wires 13 are disposed so as to be superposed on the upper faces of the three electrodes 12. Each wire 13 is composed of an electrically-conductive wire member, and a dielectric body that covers the surface of the wire member. The three wires 13 are disposed so as to be arranged along the longitudinal direction of the electrodes 12 (the Y-axis direction). Each wire 13 is disposed, extending in the X-axis direction, so as to extend across the three electrodes 12. The configuration of the wire 13 will be described later with reference to FIG. 9A and FIG. 9B.

After the three wires 13 have been disposed, each wire 13 is connected to the base member 11 by connection members 14 so as to be movable in the longitudinal direction (the X-axis direction) of the wire 13. In the example shown in FIG. 1C, 12 connection members 14 connect the wires 13 to the base member 11 at positions other than the positions where the electrodes 12 and the wires 13 overlap each other.

Each connection member 14 is implemented as a thread, for example. The thread used for the connection member 14 may be a stranded thread obtained by stranding fibers, or may be a single fiber (i.e., monofilament) which is not stranded. The fiber forming the thread used for the connection member 14 may be a chemical fiber or a natural fiber, or may be a mixed fiber of a chemical fiber and a natural fiber.

The chemical fiber used for the connection member 14 is a synthetic fiber, a semisynthetic fiber, a regenerated fiber, an inorganic fiber, or the like. Examples of the synthetic fiber include polystyrene-based fibers, aliphatic polyamide-based fibers (e.g., nylon 6 fiber, nylon 66 fiber), aromatic polyamide-based fibers, polyvinyl alcohol-based fibers (e.g., vinylon fiber), polyvinylidene chloride-based fibers, polyvinyl chloride-based fibers, polyester-based fibers (e.g., polyester fiber, PET fiber, PBT fiber, polytrimethylen-terephthalate fiber, polyalylate fiber), polyacrylonitrile-based fibers, polyethylene-based fibers, polypropylene-based fibers, polyurethane-based fibers, phenol-based fibers, and polyfluoroethylene-based fibers. Examples of the semisynthetic fiber include cellulose-based fibers and protein-based fibers. Examples of the regenerated fiber include a rayon fiber, a cupra fiber, and a lyocell fiber. Examples of the inorganic fiber include a glass fiber, a carbon fiber, a ceramic fiber, and a metal fiber.

The natural fiber used for the connection member 14 is a vegetable fiber, an animal fiber, or the like. Examples of the vegetable fiber include cotton and hemp (e.g., flax, ramie). Examples of the animal fiber include hair (e.g., wool, angora, cashmere, mohair), silk, and feathers (e.g., down, feather).

Preferably, the thread used for the connection member 14 is a stretchable thread such as a thread for knitting. The stretchable thread is available as a commercial product such as EIFFEL (Kanagawa Co., Ltd.) or SOLOTEX (TEIJIN FRONTIER Co., Ltd.), for example.

Subsequently, as shown in FIG. 2A, cables 21a are respectively drawn from end portions on the Y-axis negative side of the three electrodes 12 shown in FIG. 1C, and the three cables 21a are connected to a connector 21. In addition, end portions on the X-axis negative side of the wires 13 shown in FIG. 1C are connected to a connector 22 as shown in FIG. 2A. In this manner, the three cables 21a are connected to the connector 21, and the three wires 13 are connected to the connector 22, whereby the capacitance according to combinations of the three electrodes 12 and the wire members in the three wires 13 can be detected.

Figure 2B:
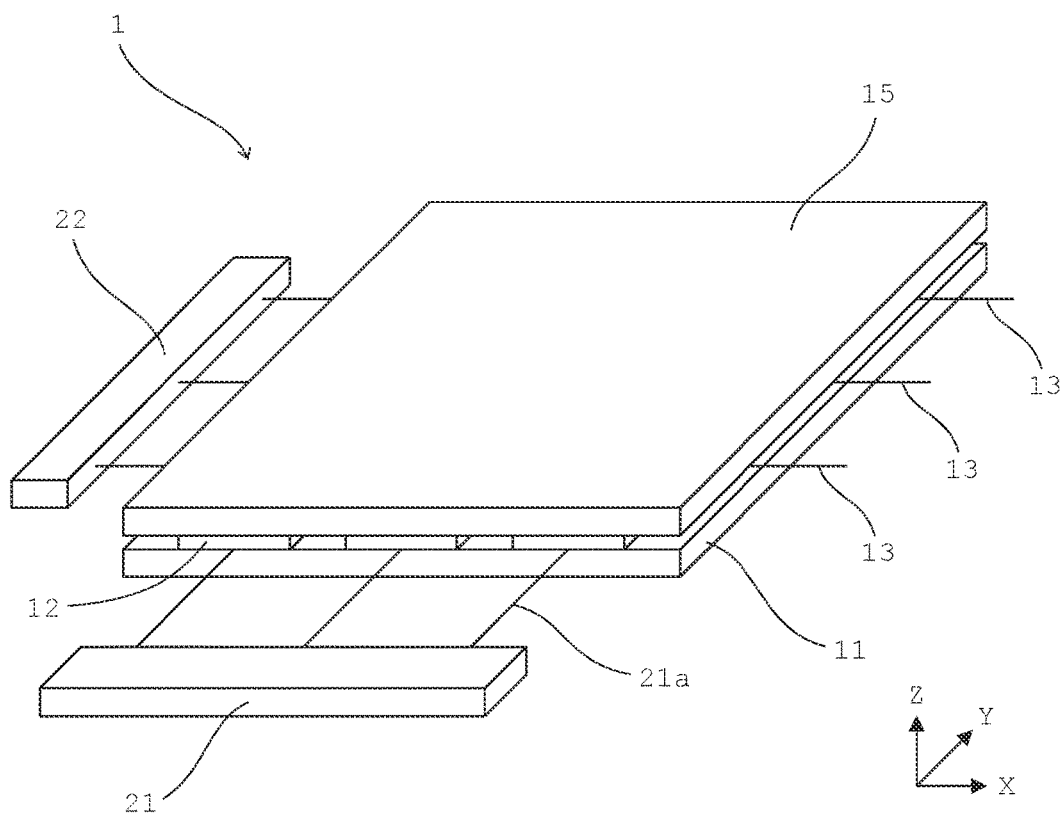
FIG. 2B is a perspective view schematically showing a configuration of the load sensor of which assembling has been completed, according to Embodiment 1.

Subsequently, from above the three wires 13 shown in FIG. 2A, a base member 15 is set as shown in FIG. 2B. The base member 15 is an insulative member. The base member 15 is a resin material of at least one type selected from the group consisting of polyethylene terephthalate, polycarbonate, polyimide, and the like, for example. The base member 15 has a flat plate shape parallel to the X-Y plane, and the size of the base member 15 in the X-Y plane is similar to that of the base member 11. The vertexes at the four corners of the base member 15 are connected to the vertexes at the four corners of the base member 11 by a silicone rubber-based adhesive, a thread, or the like, whereby the base member 15 is fixed to the base member 11. Accordingly, the load sensor 1 is completed as shown in FIG. 2B.

Next, five printing methods that can be used when the electrodes 12 are to be formed on the upper face of the base member 11 are described one by one. The printing methods for forming the electrodes 12 on the upper face of the base member 11 are not limited to the five printing methods below, and may be a printing method that can form the electrodes 12 on the upper face of the base member 11 such that the electrodes 12 have a thickness similar to that according to the five printing methods below.

FIG. 3A to FIG. 3C are schematic diagrams for describing screen printing. The screen printing is a kind of hole printing in which printing is performed by passing an ink through holes.

As shown in FIG. 3A, in the screen printing, a screen printing plate 111 and a squeegee 112 are used. In the screen printing plate 111, holes 111a extending in the Y-axis direction are formed in accordance with the shapes of the electrodes 12 to be formed on the upper face of the base member 11. An ink 100 to be applied during the screen printing is an ink composed of the same material as that of the electrodes 12.

When screen printing is performed, as shown in FIG. 3A, the screen printing plate 111 is brought close to the upper face of the base member 11 in a state where the ink 100 is applied to the upper face of the screen printing plate 111. As shown in FIG. 3B, when the screen printing plate 111 has been placed on the upper face of the base member 11, the squeegee 112 is moved in the X-axis direction. Accordingly, the ink 100 enters the holes 111a and the ink 100 is transferred to the upper face, of the base member 11, that corresponds to the portions of the holes 111a. The thickness of the ink 100 (the electrode 12) formed on the upper face of the base member 11 is determined by the depth (the width in the Z-axis direction) of each hole 111a. Then, as shown in FIG. 3C, the screen printing plate 111 is released from the base member 11. Then, formation of the electrodes 12 onto the base member 11 ends.

FIG. 4 is a schematic diagram for describing gravure printing. Gravure printing is a kind of intaglio printing in which an ink having entered a recess is transferred.

As shown in FIG. 4, in gravure printing, a container 121, a plate cylinder 122, and an impression cylinder 123 are used. The container 121 stores the ink 100. The plate cylinder 122 has formed therein recesses 122a extending in the Y-axis direction in accordance with the shapes of the electrodes 12 to be formed on the face on the Z-axis positive side of the base member 11.

When gravure printing is performed, the plate cylinder 122 and the impression cylinder 123 are rotated, and the base member 11 is passed between the plate cylinder 122 and the impression cylinder 123. Accordingly, the ink 100 in the container 121 enters the recesses 122a of the plate cylinder 122, and the ink 100 in each recess 122a is transferred to the face on the Z-axis positive side of the base member 11, as a result of the impression cylinder 123 pressing the base member 11 in the Z-axis positive direction. The thickness of the ink 100 (the electrode 12) formed on the face on the Z-axis positive side of the base member 11 is determined by the depth of each recess 122a of the plate cylinder 122. Then, formation of the electrodes 12 onto the base member 11 ends.

FIG. 5 is a schematic diagram for describing flexographic printing. Flexographic printing is a kind of letterpress printing in which an ink attached to protrusions is transferred.

As shown in FIG. 5, in flexographic printing, a doctor chamber 131, an anilox roll 132, a plate 133, and a center drum 134 are used. The doctor chamber 131 stores the ink 100. The plate 133 has formed therein protrusions 133a extending in the Y-axis direction in accordance with the shapes of the electrodes 12 to be formed on the face on the Z-axis positive side of the base member 11.

When flexographic printing is performed, the anilox roll 132 and the plate 133 are rotated, and the ink 100 in the doctor chamber 131 is applied to the protrusions 133a of the plate 133. The base member 11 is disposed on the center drum 134, and due to rotation of the center drum 134, the base member 11 is transported between the plate 133 and the center drum 134. Accordingly, the ink 100 on the protrusions 133a is transferred onto the face on the Z-axis positive side of the base member 11. The thickness of the ink 100 (the electrode 12) formed on the face on the Z-axis positive side of the base member 11 is determined by the distance at which each protrusion 133a of the plate 133 and the base member 11 come closest to each other. Then, formation of the electrodes 12 onto the base member 11 ends.

FIG. 6 is a schematic diagram for describing offset printing.

As shown in FIG. 6, in offset printing, an ink roller 141, a water roller 142, a container 143, a plate cylinder 144, a blanket 145, and an impression cylinder 146 are used. The container 143 stores dampening water 101.

When offset printing is performed, the ink roller 141 is rotated, whereby the ink 100 is applied to the plate cylinder 144. In addition, the water roller 142 is rotated, whereby the dampening water 101 in the container 143 is applied to the plate cylinder 144. At this time, the ink 100 is applied to the plate cylinder 144 such that the ink 100 on the plate cylinder 144 corresponds to the width (the length in the X-axis direction) of each electrode 12 to be formed on the base member 11. Due to rotation of the plate cylinder 144 and the blanket 145, out of the dampening water 101 and the ink 100 on the plate cylinder 144, the ink 100 is moved onto the blanket 145. Then, the blanket 145 and the impression cylinder 146 are rotated, and the base member 11 is passed between the blanket 145 and the impression cylinder 146. Accordingly, the ink 100 on the blanket 145 is transferred to the upper face of the base member 11. The thickness of the ink 100 (the electrode 12) formed on the upper face of the base member 11 is determined by the distance between the blanket 145 and the impression cylinder 146. Then, formation of the electrodes 12 onto the base member 11 ends.

FIG. 7 is a schematic diagram for describing gravure offset printing.

As shown in FIG. 7, in gravure offset printing, an ink roll 151, an ink dish 152, a doctor 153, a gravure plate cylinder 154, a blanket cylinder 155, and an impression cylinder 156 are used. The ink dish 152 stores the ink 100. The gravure plate cylinder 154 has formed therein recesses 154a extending in the Y-axis direction in accordance with the shapes of the electrodes 12 to be formed on the upper face of the base member 11.

When gravure offset printing is performed, the ink roll 151 is rotated, whereby the ink 100 in the ink dish 152 is applied to the gravure plate cylinder 154. The ink 100 applied to the gravure plate cylinder 154 is caused to be held in each recess 154a of the gravure plate cylinder 154 by the doctor 153. The gravure plate cylinder 154 and the blanket cylinder 155 are rotated, whereby the ink 100 in each recess 154a is moved onto the blanket cylinder 155. Then, the blanket cylinder 155 and the impression cylinder 156 are rotated, and the base member 11 is passed between the blanket cylinder 155 and the impression cylinder 156. Accordingly, the ink 100 on the blanket cylinder 155 is transferred to the upper face of the base member 11. The thickness of the ink 100 (the electrode 12) formed on the upper face of the base member 11 is determined by the depth of each recess 154a and the distance between the blanket cylinder 155 and the impression cylinder 156. Then, formation of the electrodes 12 onto the base member 11 ends.

As described above, according to each printing method, each electrode 12 can be formed so as to have a thickness of about 0.001 mm to 0.5 mm, on the upper face of the base member 11.

Figure 8:
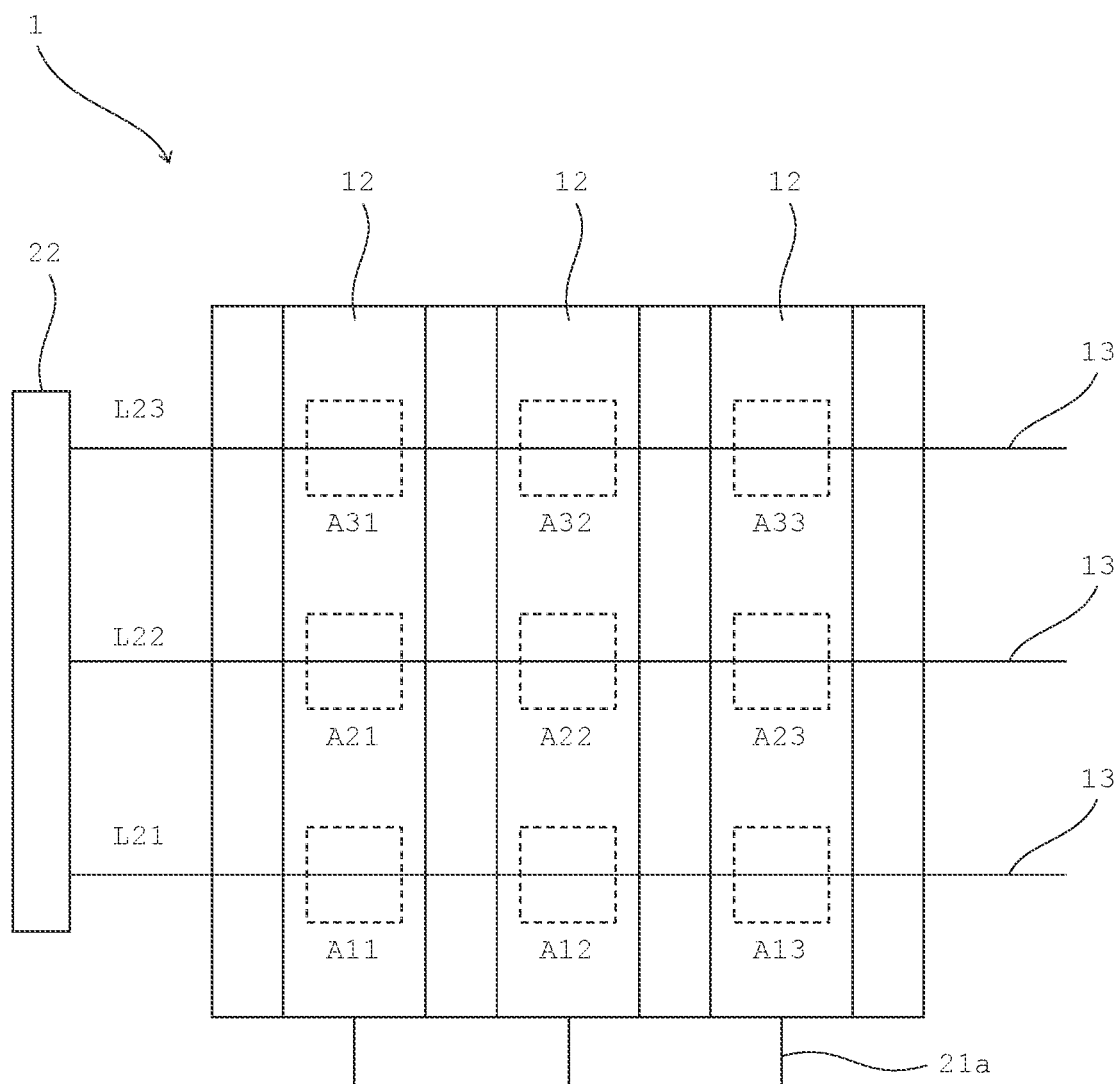
FIG. 8 is a plan view schematically showing the load sensor when viewed in a Z-axis negative direction according to Embodiment 1.

FIG. 8 is a plan view schematically showing the load sensor 1 when viewed in the Z-axis negative direction. For convenience, the base member 15 is not shown in FIG. 8.

As shown in FIG. 8, at positions at which the three electrodes 12 and the three wires 13 cross each other, regions A11, A12, A13, A21, A22, A23, A31, A32, A33 for detecting loads are set. When a load is applied in the Z-axis direction to each region, the electrode 12 warps so as to wrap the wire 13. Accordingly, the contact area between the electrode 12 and the wire 13 changes, and the capacitance between the electrode 12 and the wire 13 changes.

As shown in FIG. 8, the cables 21a drawn from the three electrodes 12 are referred to lines L11, L12, L13, and the wire members 13a in the three wires 13 are referred to as lines L21, L22, L23. The positions at which the line L21 crosses the lines L11, L12, L13 are defined as regions A11, A12, A13, respectively, the positions at which the line L22 crosses the lines L11, L12, L13 are defined as regions A21, A22, A23, respectively, and the positions at which the line L23 crosses the lines L11, L12, L13 are defined as regions A31, A32, A33, respectively.

When a load is applied to the region A11, the contact area between the electrode 12 and the wire 13 increases in the region A11. Therefore, when the capacitance between the line L11 and the line L21 is detected, the load applied to the region A11 can be calculated. Similarly, in another region as well, when the capacitance between the two lines crossing each other in the other region is detected, the load applied to the other region can be calculated.

For example, when one of the three cables 21a is selectively connected to the ground, and the voltage between this cable 21a and one of the three wires 13 is detected, the capacitance in the region in which the cable 21a and the wire 13 cross each other can be detected. On the basis of this capacitance, the load applied to the region can be calculated.

Figure 9A:
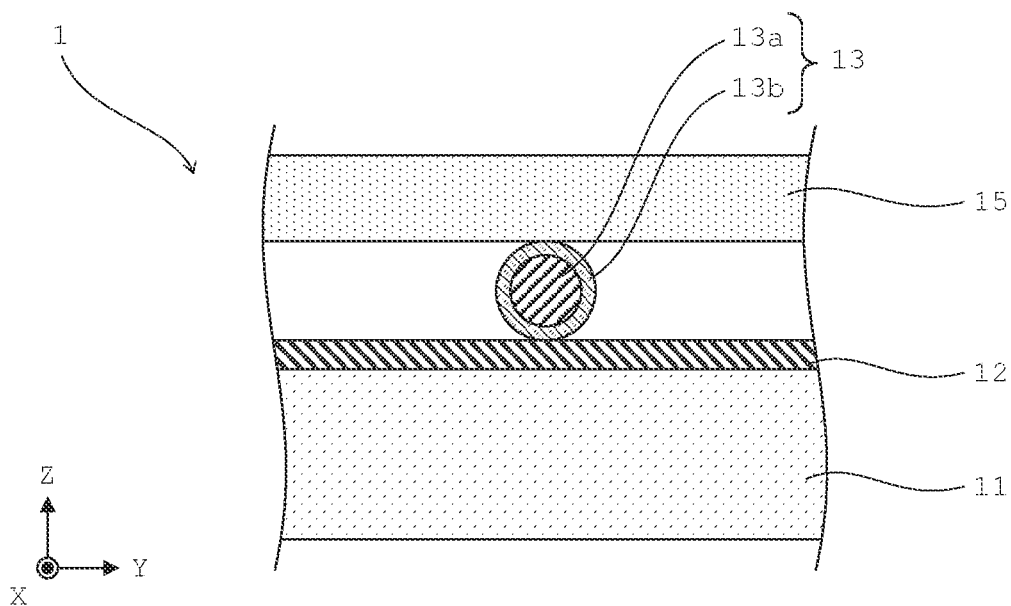
FIG. 9A and FIG. 9B are each a cross-sectional view schematically showing the periphery of a wire when viewed in an X-axis negative direction according to Embodiment 1.
Figure 9B:
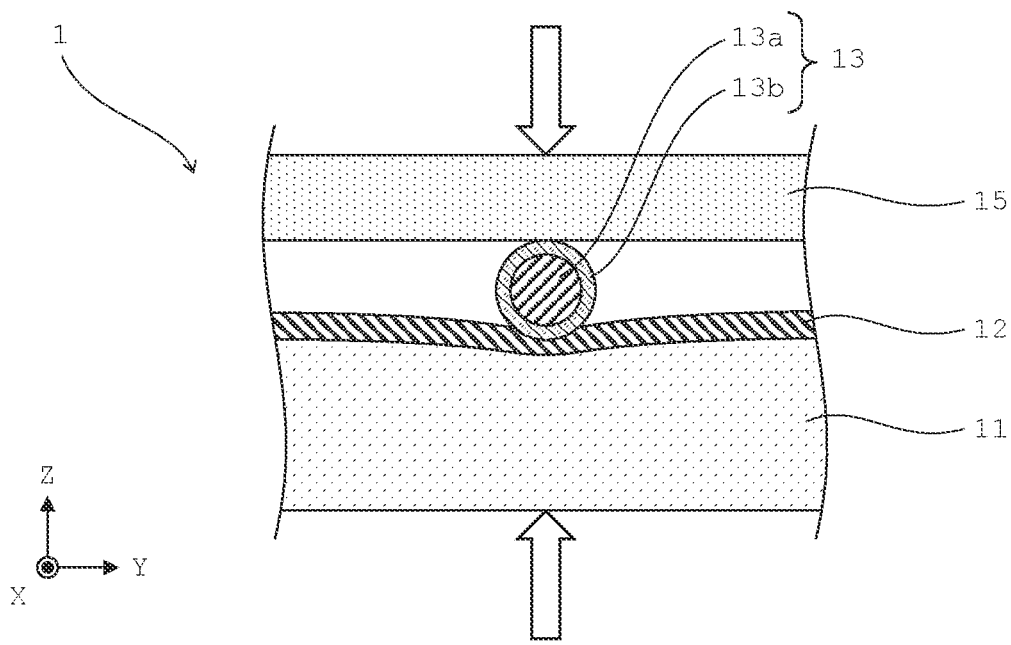

FIG. 9A and FIG. 9B are each a cross-sectional view schematically showing the periphery of a wire 13 when viewed in the X-axis negative direction. FIG. 9A shows a state where no load is applied, and FIG. 9B shows a state where loads are applied.

As shown in FIG. 9A, the wire 13 is composed of an electrically-conductive wire member 13a and a dielectric body 13b covering the wire member 13a. The wire member 13a is implemented as, for example: a metal body; a glass body and an electrically-conductive layer formed on the surface thereof; a resin body and an electrically-conductive layer formed on the surface thereof; or the like. When a glass body is used, an electrically-conductive filler may be dispersed in the glass body. When a resin body is used, an electrically-conductive filler may be dispersed in the resin body.

The metal body used for the wire member 13a is a metal of at least one type selected from the group consisting of Au (gold), Ag (silver), Cu (copper), a Ni—Cr alloy (nichrome), C (carbon), ZnO (zinc oxide), $In_2O_3$ (indium oxide (III)), $SnO_2$ (tin oxide (IV)), and the like, for example. The glass body used for the wire member 13a is not limited in particular, and may be any glass body that has a network-like structure of silicon oxide, and is a glass material of at least one type selected from the group consisting of quartz glass, soda-lime glass, borosilicate glass, lead glass, and the like, for example. The resin body used for the wire member 13a is a resin material of at least one type selected from the group consisting of a styrene-based resin, a silicone-based resin (e.g., PDMS), an acrylic resin, a rotaxane-based resin, a urethane-based resin, and the like.

The electrically-conductive layer of the glass body and the resin body may be formed, for example, by vapor deposition of a metal of at least one type selected from the group consisting of metals similar to the metals that can form the metal body, or may be formed by application of an electrically-conductive ink. The electrically-conductive filler of the glass body and the resin body is a metal of at least one type selected from the group consisting of metals similar to the metals that can form the metal body.

The dielectric body 13b has an electric insulation property, and is formed from a resin material, a ceramic material, a metal oxide material, or the like, for example. The dielectric body 13b may be a resin material of at least one type selected from the group consisting of a polypropylene resin, a polyester resin (e.g., polyethylene terephthalate resin), a polyimide resin, a polyphenylene sulfide resin, a polyvinyl formal resin, a polyurethane resin, a polyamide imide resin, a polyamide resin, and the like, or may be a metal oxide material of at least one type selected from the group consisting of $Al_2O_3$, $Ta_2O_5$, and the like.

When no load is applied to the region shown in FIG. 9A, the force applied between the electrode 12 and the wire 13, and the force applied between the wire 13 and the base member 15 are substantially zero. From this state, when a load is applied in the upward direction to the lower face of the base member 11 and a load is applied in the downward direction to the upper face of the base member 15 as shown in FIG. 9B, the electrode 12 and the base member 11 which have elasticity are deformed by the wire 13, as shown in FIG. 9B. It should be noted that, when the lower face of the base member 11 or the upper face of the base member 15 is placed on a stationary object and a load is applied only to the other base member as well, a load will be similarly received from the stationary object side due to reaction.

As shown in FIG. 9B, when the loads are applied, the wire 13 is brought close to the electrode 12 and the base member 11 so as to be wrapped by the electrode 12 and the base member 11, and the contact area between the wire 13 and the electrode 12 increases. Accordingly, the capacitance between the wire member 13a in the wire 13 and the electrode 12 changes, and as described with reference to FIG. 8, the capacitance between two lines corresponding to this region is detected, and the load applied to this region is calculated.

Here, in a case of an electrode obtained by dispersing an electrically-conductive filler in an elastic material, it is known that the electrically-conductive filler serves as an inhibitive factor against elastic return of the electrode, whereby response of the elastic return is impaired. When such an electrode is used and a load is provided and removed, property deviation (hysteresis) occurs in change in capacitance, and thus, changes in capacitance during loading and during unloading are deviated from each other.

Therefore, the inventors have conducted various studies, and found that when the thickness of each electrode 12 formed on the upper face of the base member 11 is reduced by using the printing methods as described with reference to FIG. 3A to FIG. 7, the property deviation of the electrode 12 can be suppressed. As described above, when the electrode 12 is formed to be thin by a predetermined printing method on the upper face of the base member 11, the structure composed of the electrode 12 and the base member 11 has a sufficient elastic force while the capacitance between the electrode 12 and the wire member 13*a* is allowed to change in accordance with the load, as shown in FIG. 9B. Therefore, during unloading, the state in FIG. 9B quickly returns to the state in FIG. 9A. That is, in elastic deformations of the electrode 12 and the base member 11, influence of the elastic deformation of the base member 11 becomes dominant, and influence of the filler contained in the electrode 12 is significantly suppressed. Accordingly, change in capacitance during unloading can be made close to change in capacitance during loading.

FIG. 10A is a schematic diagram obtained when the load sensor 1 cut, at the position of wire 13, along a plane parallel to the X-Z plane is viewed in the Y-axis positive direction.

As described with reference to FIG. 1C, the connection members 14 connect the wires 13 to the base member 11 on the X-axis positive side and the X-axis negative side of each electrode 12. Here, as described above, the electrode 12 on the upper face of the base member 11 is an electrode formed, by a printing method, so as to be very thin such that the thickness thereof is 10 μm to 150 μm. Accordingly, as shown in FIG. 10A, an interval D1 between the wire 13 and the base member 11 is also very small. Therefore, even when the wire 13 and the base member 11 are brought close to each other due to fastening of the connection members 14, the warps in the Z-axis direction of the wire 13 and the base member 11 can be suppressed to the distance D1 or less.

Meanwhile, when electrodes 12 created in advance are set on the upper face of the base member 11 with an adhesive or the like, the thickness of each electrode 12 on the upper face of the base member 11 is increased to be about 0.5 mm to 1 mm, as shown in FIG. 10B. Thus, when the thickness of the electrode 12 is large, an interval D2 between the wire 13 and the base member 11 becomes greater than the interval D1 shown in FIG. 10A. In this case, when the wire 13 and the base member 11 are brought close to each other due to fastening of the connection members 14, the warps in the Z-axis direction of the wire 13 and the base member 11 are increased to be about the distance D2. This may causes decrease of load detection accuracy. In contrast to this, in Embodiment 1, since the interval between the wire 13 and the base member 11 is small as described above, unintended deformation of the base member 11 and the wire 13 is suppressed. Therefore, load detection accuracy can be ensured to be high.

Next, a preferable size of each part of the load sensor 1 is described with reference to FIG. 11.

Figure 11:
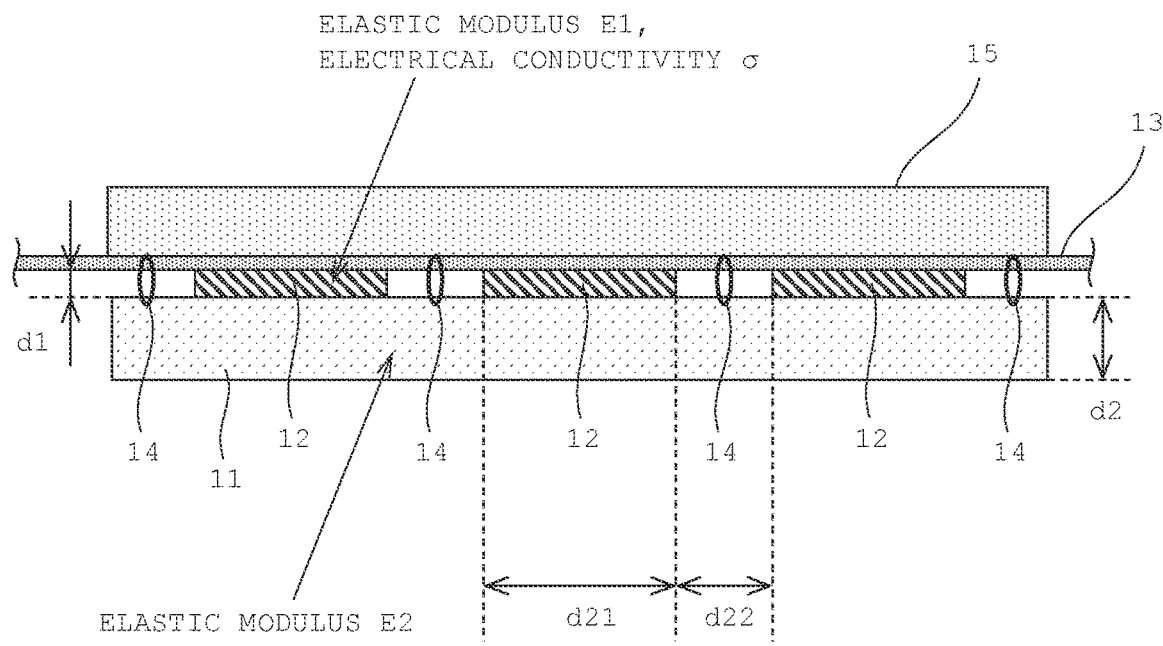
FIG. 11 is a schematic diagram for describing a preferable size of each part of the load sensor according to Embodiment 1.

As shown in FIG. 11, the thickness (the height in the Z-axis direction) of each electrode 12 is defined as d1, the thickness (the height in the Z-axis direction) of the base member 11 is defined as d2, the width (the length in the X-axis direction) of each electrode 12 is defined as d21, the interval between electrodes 12 (the distance in the X-axis direction between two electrodes 12) is defined as d22, the elastic modulus of each electrode 12 is defined as E1, the electrical conductivity of each electrode 12 is defined as σ, and the elastic modulus of the base member 11 is defined as E2.

According to the studies by the inventors, the following can be assumed. That is, when the elastic modulus E1 of the electrode 12 is set to be 0.1 MPa to 10 MPa, the electrical conductivity σ of the electrode 12 is set to be not greater than 100 Ω·cm, the elastic modulus E2 of the base member 11 is set to be 0.01 MPa to 10 MPa, the thickness d1 of the electrode 12 is set to be 0.001 mm to 0.5 mm, the thickness d2 of the base member 11 is set to be 0.01 mm to 2 mm, the width d21 of the electrode 12 is set to be 2 mm to 50 mm, and the interval d22 of the electrode 12 is set to be 1 mm to 5 mm, change in capacitance during unloading can be made close to change in capacitance during loading, as described with reference to FIG. 9A and FIG. 9B, and warps of the wire 13 and the base member 11 at the time of fastening of the connection members 14 can be suppressed, as described with reference to FIG. 10A and FIG. 10B.

Effects of Embodiment 1

According to Embodiment 1, the following effects are exhibited.

When the thickness of the base member 11 and the thickness of the electrode are set as described above, the thickness of the electrode 12 can be made sufficiently smaller than the thickness of the base member 11. Accordingly, in deformations of the electrode 12 and the base member 11 during loading and during unloading, influence of the deformation of the electrode 12 is suppressed, and influence of the deformation of the base member 11 becomes dominant. Therefore, influence of response impairment in elastic return of the electrode 12 can be suppressed, and as a result, changes in capacitance during loading and during unloading can be caused to substantially match each other. Therefore, deviation between the detection values of the load sensor 1 during loading and during unloading can be suppressed.

As described with reference to FIG. 10A, the interval D1 between the wire 13 and the base member 11 is a very small value in accordance with the thickness of the electrode 12. Therefore, deformations of the wire 13 and the base member 11 due to fastening of the connection members 14 can be suppressed. Accordingly, load detection accuracy can be enhanced.

Each electrode 12 is an electrode formed on the upper face of the base member 11 by a predetermined printing method as shown in FIG. 3A to FIG. 7, i.e., screen printing, gravure printing, flexographic printing, offset printing, or gravure offset printing. Thus, by using the printing method, it is possible to smoothly and accurately form, on the upper face of the base member 11, the electrode 12 that has a thickness sufficiently smaller than the thickness of the base member 11.

A plurality of electrodes 12 are formed so as to be separate from each other on the upper face of the base member 11. Therefore, the load detection range of the load sensor 1 can be divided into a plurality of ranges.

Each electrode 12 has a band-like shape that is long in one direction (the Y-axis direction), and a wire 13 (the wire member 13*a*) is disposed so as to extend across the plurality of electrodes 12. Therefore, at the crossing positions (in FIG. 8, the regions A11, A12, A13, A21, A22, A23, A31, A32, A33) at which the wire members 13*a* extend across the plurality of electrodes 12, loads can be detected.

In addition, a plurality of wires 13 (the wire members 13*a*) are disposed along the longitudinal direction (the Y-axis direction) of the electrodes 12. Therefore, as shown in FIG. 8, the crossing positions at which the plurality of electrodes 12 and the plurality of wire members 13*a* cross each other can be arranged in a matrix shape. Thus, detection positions can be finely set.

Each wire 13 (the wire member 13*a*) is connected to the base member 11 by connection members 14 so as to be movable in the longitudinal direction (the X-axis direction). In a case where the wire 13 is fixed to the base member 11 by an adhesive or the like, when the base member 11 and the electrodes 12 stretch and contract, a situation in which the dielectric body 13b covering the wire member 13a is detached because of the adhesive may occur. In contrast to this, in Embodiment 1, the wire 13 (the wire member 13a) is connected to the base member 11 so as to be movable in the longitudinal direction (the X-axis direction) by connection members 14 each implemented as a thread or the like. Therefore, even if the base member 11 and the electrodes 12 stretch and contract, the positional relationship between the wire 13 (the wire member 13a) and the connection members 14 changes, and thus, breakage of the dielectric body 13b can be inhibited. Therefore, decrease of the load detection accuracy due to breakage of the dielectric body 13b can be inhibited.

Embodiment 2

In Embodiment 1, the base member 15 is superposed from above on the structure shown in FIG. 2A, whereby the load sensor 1 is formed. However, in Embodiment 2, the structure shown in FIG. 1B is superposed on the structure shown in FIG. 2A, whereby a load sensor 1 is formed.

Figure 12:
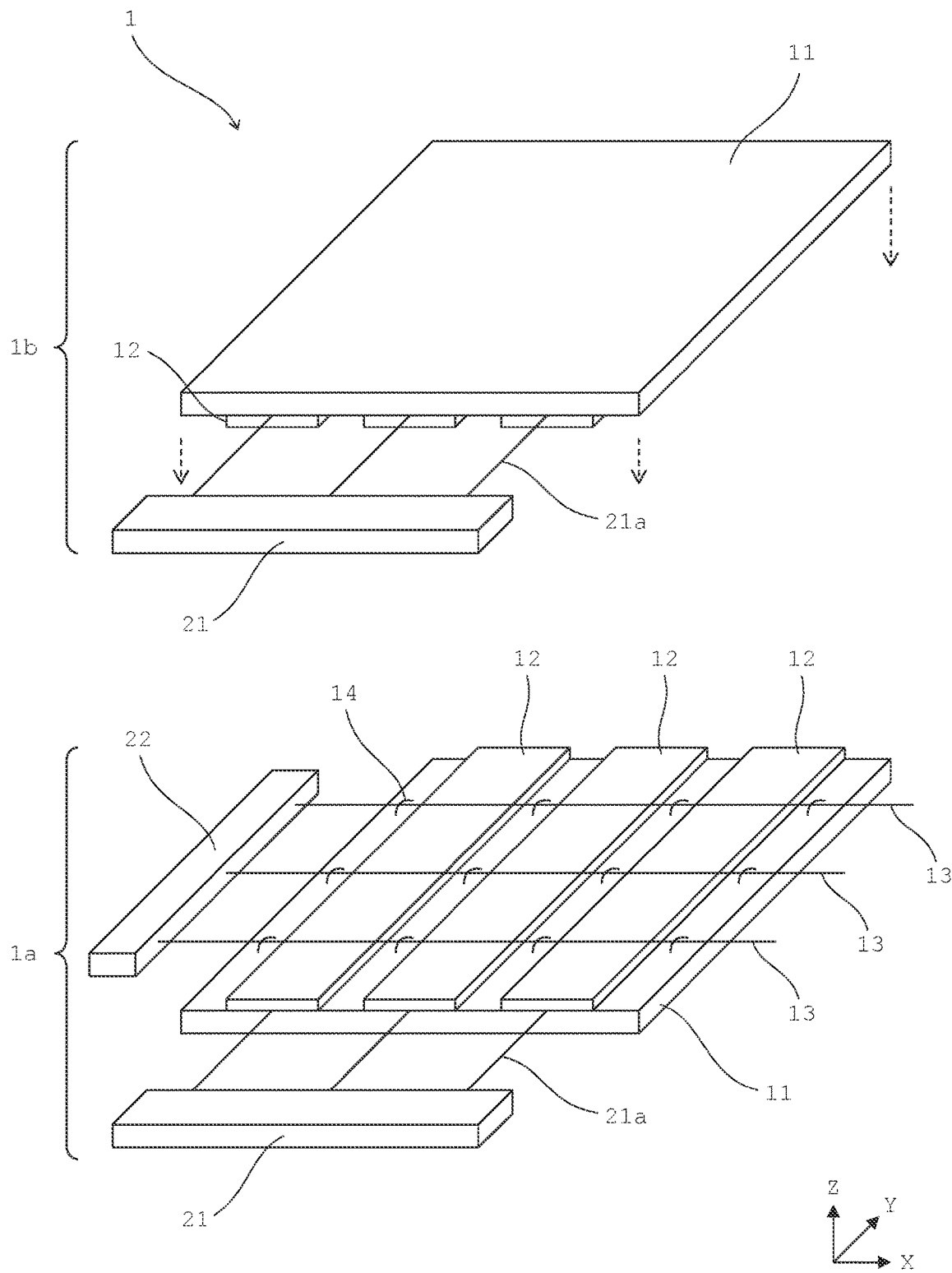
FIG. 12 is a perspective view schematically showing a configuration of each part of a load sensor according to Embodiment 2.
Figure 13:
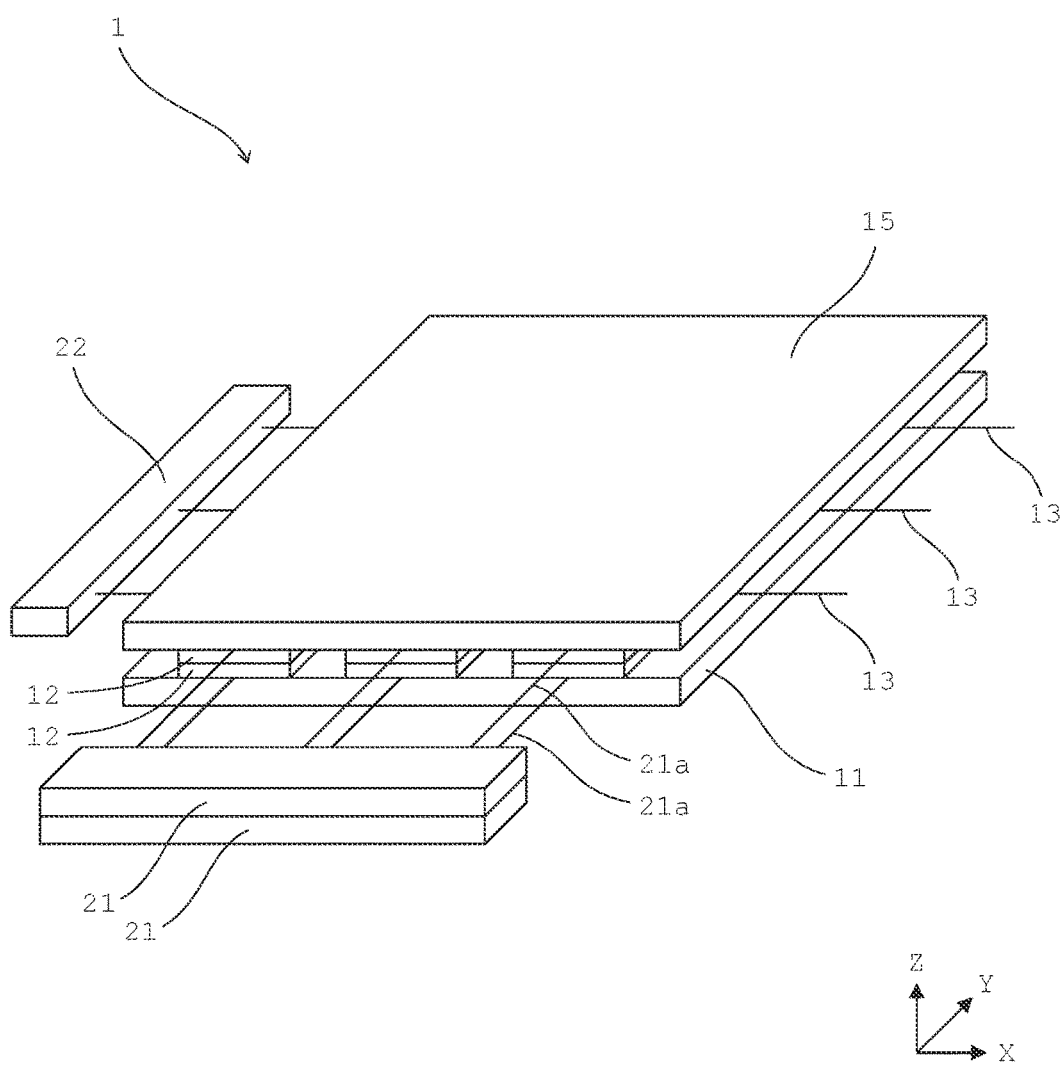
FIG. 13 is a perspective view schematically showing a configuration of the load sensor of which assembling has been completed, according to Embodiment 2.

With reference to FIG. 12 and FIG. 13, a manufacturing method of the load sensor 1 of Embodiment 2 is described. FIG. 12 and FIG. 13 are each a perspective view schematically showing a configuration of each part of the load sensor 1.

As shown in FIG. 12, in Embodiment 2, a structure 1a similar to that in FIG. 2A is produced by a procedure similar to that in Embodiment 1. Then, separately from the structure 1a, a structure similar to that in FIG. 1B is produced by a procedure similar to that in Embodiment 1. In a state where this structure is reversed in the up-down direction, three cables 21a and a connector 21 are connected to three electrodes 12, whereby a structure 1b is produced.

Subsequently, the structure 1b is set from above the structure 1a, and the four corners of the upper face of the base member 11 on the lower side and the four corners of the lower face of the base member 11 on the upper side are fixed to each other by an adhesive, a thread, or the like. Then, as shown in FIG. 13, the load sensor 1 of Embodiment 2 is completed. In Embodiment 2 as well, nine regions for load detection are set as in FIG. 8.

Figure 14A:
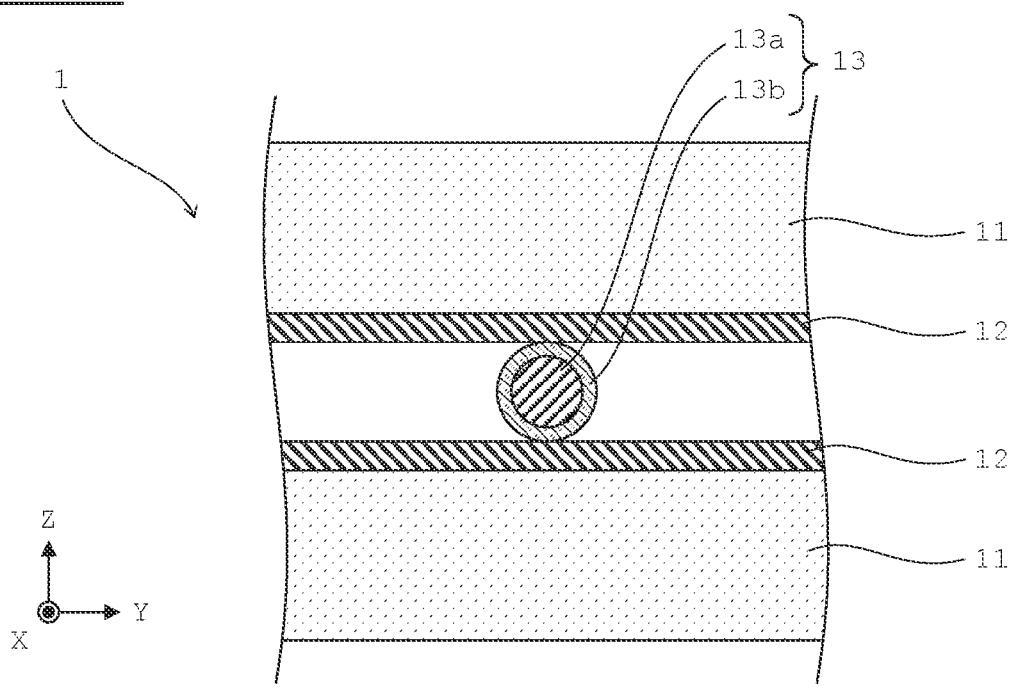
FIG. 14A and FIG. 14B are each a cross-sectional view schematically showing the periphery of a wire when viewed in the X-axis negative direction, according to Embodiment 2.
Figure 14B:
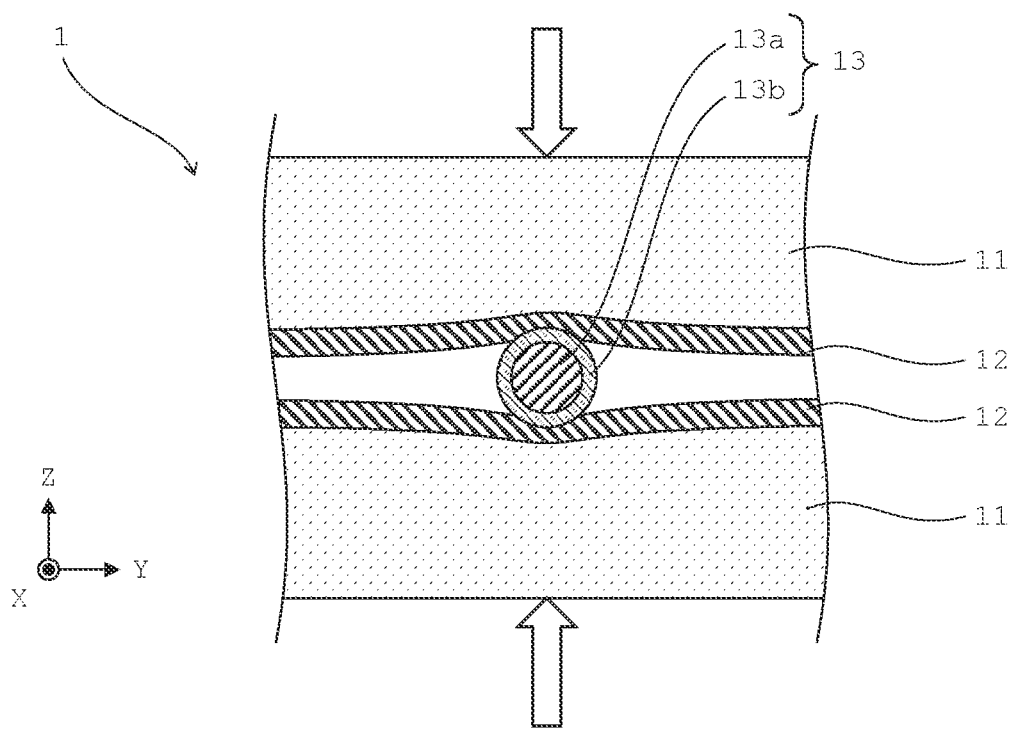

FIG. 14A and FIG. 14B are each a cross-sectional view schematically showing the periphery of a wire 13 when viewed in the X-axis negative direction. FIG. 14A shows a state where no load is applied, and FIG. 14B shows a state where loads are applied.

When no load is applied to the region shown in FIG. 14A, the force applied between the upper electrode 12 and the wire 13 and the force applied between the lower electrode 12 and the wire 13 are substantially zero. From this state, as shown in FIG. 14B, when a load is applied in the downward direction to the upper face of the upper base member 11, and a load is applied in the upward direction to the lower face of the lower base member 11, the electrodes 12 and the base member 11 which have elasticity are deformed by the wire 13 as shown in FIG. 14B.

As shown in FIG. 14B, when the loads are applied, the wire 13 is brought close to the upper electrode 12 and the upper base member 11 so as to be wrapped by the upper electrode 12 and the upper base member 11. Similarly, the wire 13 is brought close to the lower electrode 12 and the lower base member 11 so as to be wrapped by the lower electrode 12 and the lower base member 11. Accordingly, the capacitance between the wire member 13a and the upper electrode 12, and the capacitance between the wire member 13a and the lower electrode 12 change. Then, on the basis of the sum of the two capacitances, a load applied to the corresponding region among the nine regions shown in FIG. 8 is calculated.

<Verification Experiment 1>

With respect to the load sensor 1 of Embodiment 2 and a load sensor 200 of a comparative example, the inventors actually confirmed the relationship between capacitance and load through a verification experiment.

With reference to FIG. 15A and FIG. 15B, the size of each part of the load sensor 1 used in the verification experiment is described. FIG. 15A and FIG. 15B are each a cross-sectional view schematically showing the periphery of wires 13 when viewed in the X-axis negative direction. FIG. 15A shows the load sensor 200 of the comparative example, and FIG. 15B shows the load sensor 1 that is substantially the same as that of Embodiment 2. In each of the configurations in FIG. 15A and FIG. 15B, base members 11 and electrodes 12 are positioned on the upper side and on the lower side, respectively, with two wires 13 extending in the X-axis direction therebetween.

As shown in FIG. 15A, in the case of the load sensor 200 of the comparative example, a thickness d11 of the lower electrode 12 was set to be 1 mm, and a thickness d12 of the upper electrode 12 was set to be 0.5 mm. Here, these two electrodes 12 were created in advance, and were set on the respective base members 11 with an adhesive or the like. The thickness d2 of each of the upper and lower base members 11 was set to be 0.5 mm. As shown in FIG. 15B, in the case of the load sensor 1 of Embodiment 2, the thickness d11 of the lower electrode 12 and the thickness d12 of the upper electrode 12 were each set to be 10 μm to 150 μm by a printing method as described above. The thickness d2 of each of the upper and lower base members 11 was set to be 0.5 mm, as in the case of the comparative example. That is, the ratio of the thickness of the electrode 12 to the thickness of the base member 11 was set to be not less than 0.02 and not greater than 0.3.

In each of the cases of FIG. 15A and FIG. 15B, the upper and lower electrodes 12 were connected to the ground (GND), and the wire members 13a of the two wires 13 were connected to each other. The two kinds of load sensors set as in FIG. 15A and FIG. 15B were each set on a fixation base, a load was applied within 1 cm$^2$ at the upper face of the upper base member 11, and the capacitance between the electrode 12 and each wire member 13a was measured.

FIG. 16A is a graph showing a relationship between load and capacitance of the case of the comparative example. As shown in FIG. 16A, in the comparative example, with respect to during loading and during unloading, curves different from each other were generated. Therefore, in the comparative example, even when the same load is applied, the capacitances are different between during loading and during unloading. Thus, the values of the load calculated on the basis of the capacitances become different from each other.

Meanwhile, FIG. 16B is a graph showing a relationship between load and capacitance in the case of Embodiment 2. As shown in FIG. 16B, in Embodiment 2, with respect to during loading and during unloading, curves that are substantially the same with each other were generated. Therefore, in Embodiment 2, when the same load is applied, the capacitances become substantially the same with each other between during loading and during unloading. Therefore, the values of the load calculated on the basis of the capacitances also become substantially the same with each other.

Thus, the following has been found. That is, when the thickness of each electrode 12 is set to be not less than 10

μm and not greater than 150 μm on the basis of a printing method described above, and the thickness of the base member 11 is set to be 0.5 mm, in other words, when the ratio of the thickness of the electrode 12 to the thickness of the base member 11 is set to be not less than 0.02 and not greater than 0.3, property deviation (hysteresis) that occurs in change in capacitance is suppressed, and changes in capacitance during loading and during unloading match each other.

When the thickness of the base member 11 is not less than 0.5 mm, in deformations of the electrode 12 and the base member 11 during loading and during unloading, influence of the deformation of the electrode 12 is still further suppressed and influence of the deformation of the base member 11 becomes dominant. Therefore, it is assumed that, when the thickness of the base member 11 is set to be not less than 0.5 mm, in other words, when the ratio of the thickness of the electrode 12 to the thickness of the base member 11 is set to be smaller than a range of 0.02 to 0.3, property deviation that occurs in change in capacitance is still further suppressed.

<Verification Experiment 2>

Further, through an experiment, the inventors examined the hysteresis property of the load sensor 1 in a case where the thickness of the electrode 12 was changed in the configuration of Embodiment 2 shown in FIG. 15B. In this experiment, other than the thickness of the electrode 12 being changed, the same condition as the condition applied to Embodiment 2 in the above verification experiment 1 was set. In the configuration in FIG. 15B, in a state where the thickness d11 of the lower electrode 12 and the thickness d12 of the upper electrode 12 were maintained to be equal with each other, the thickness d11, d12 was changed. The thickness d2 of the base member 11 was fixed to 0.5 mm. Under this condition, the inventors confirmed the thickness of the electrode 12 that allows appropriate load detection, and the ratio of the thickness of the electrode 12 to the thickness of the base member 11.

Figure 17A:
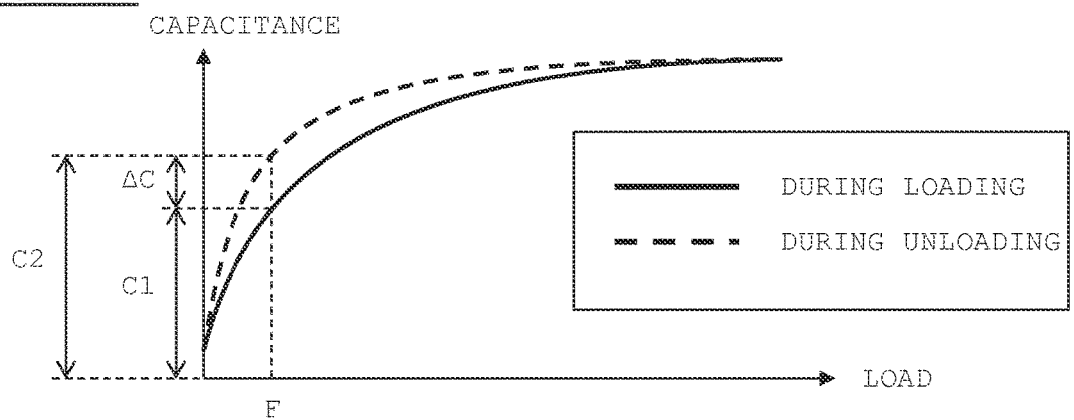
FIG. 17A is a diagram for describing calculation of hysteresis according to Embodiment 2.

In the experiment, hysteresis was obtained by the calculation method shown in FIG. 17A.

In FIG. 17A, C1 is a capacitance that corresponds to a predetermined load F during loading, and C2 is a capacitance that corresponds to the predetermined load F during unloading. ΔC is the difference between C1 and C2. Hysteresis (%) is calculated as a value of ΔC/C2 at the time when the value of ΔC/C2 becomes greatest in accordance with variation of the load F.

In the verification experiment 1 above, the hysteresis in the comparative example in FIG. 16A was 12%, and the hysteresis in Embodiment 2 in FIG. 16B was less than 0.2%. Thus, according to the configuration of Embodiment 2, the hysteresis can be considerably reduced when compared with that in the comparative example.

Figure 17B:
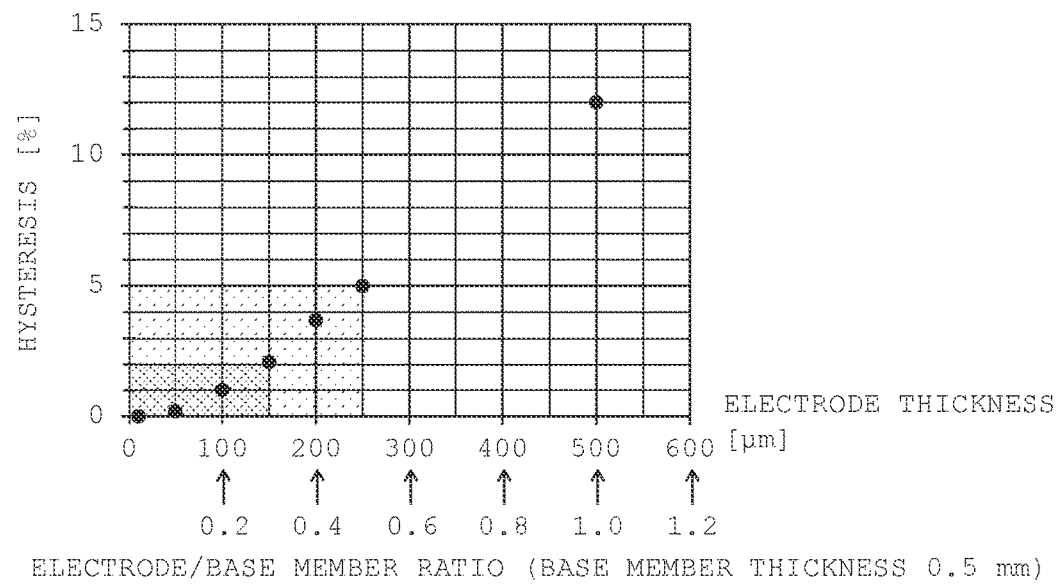
FIG. 17B is a graph showing a relationship between the thickness of an electrode and hysteresis according to Embodiment 2.

FIG. 17B is a graph showing a result of the experiment on hysteresis property. The horizontal axis represents the thickness of the electrode 12. At the horizontal axis, the ratio of the thickness of the electrode 12 to the thickness (0.5 mm) of the base member 11 is indicated by an arrow in association with the thickness of the electrode 12. The vertical axis represents hysteresis (%).

According to the studies of the inventors, in both of during loading and during unloading, an allowable range of hysteresis that allows appropriate load detection is preferably not greater than 5%, and more preferably not greater than 2%. Therefore, from the experimental result in FIG. 17B, the thickness of the electrode 12 is preferably not greater than 250 μm, and further preferably not greater than 150 μm. Similarly, from this experimental result, the ratio of the thickness of the electrode 12 to the thickness of the base member 11 is preferably not greater than 0.5, and further preferably not greater than 0.3.

Further, the inventors examined the relationship between the thickness of the electrode 12 and the volume resistivity of the electrode 12 under a similar condition.

The electrode 12 is formed from a resin material or a rubber material, and an electrically-conductive filler having a size of about several μm dispersed therein. Therefore, when the thickness of the electrode 12 is as small as about the size of the filler, the electrically-conductive filler becomes difficult to be distributed in a three-dimensional manner in the electrode 12, and as a result, the density in a plan view of the electrically-conductive filler in the electrode 12 rapidly decreases. Therefore, when the thickness of the electrode 12 is as small as about the size of the filler, the electrical conductivity of the electrode 12 significantly decreases, the volume resistivity of the electrode 12 rapidly increases, and the resistance value of the electrode 12 greatly increases. In addition, when the electrically-conductive filler becomes difficult to be distributed in a three-dimensional manner in association with decrease in the thickness of the electrode 12, variation in the volume resistivity of each electrode 12 becomes large when compared with a case where the electrically-conductive filler is appropriately distributed in a three-dimensional manner. Therefore, when the thickness of the electrode 12 is as small as about the size of the filler, variation in the volume resistivity of each electrode 12 becomes large.

As described above, when the thickness of the electrode 12 is as small as about the size of the filler, the resistance value of the electrode 12 becomes significantly large, and the variation in the resistance value of each electrode 12 becomes large. Therefore, the accuracy of measurement of the capacitance between the wire 13 and the electrode 12 performed by a measurement circuit in a later stage decreases, and a load according to the capacitance cannot be appropriately calculated. This was clarified by the inventors through a verification experiment shown below.

Figure 17C:
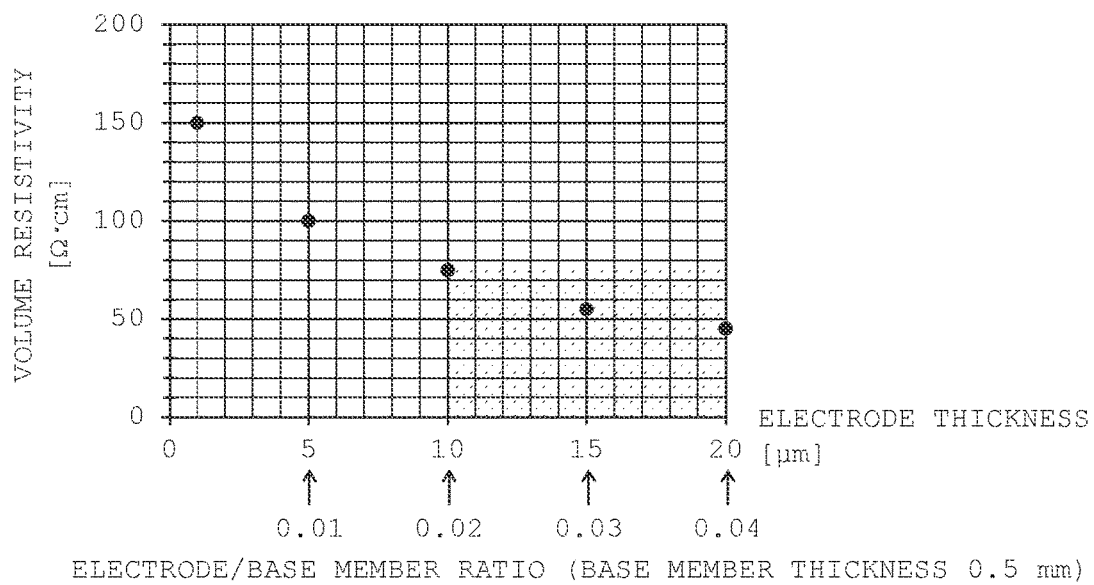
FIG. 17C is a graph showing a relationship between the thickness of an electrode and the volume resistivity of the electrode according to Embodiment 2.

FIG. 17C is a graph showing a verification result of the relationship between the thickness of the electrode 12 and the volume resistivity of the electrode 12. Similar to FIG. 17B, the horizontal axis represents the thickness of the electrode 12. Similar to FIG. 17B, at the horizontal axis, the ratio of the thickness of the electrode 12 to the thickness of the base member 11 is indicated by an arrow in association with the thickness of the electrode 12. The vertical axis represents the volume resistivity of the electrode 12.

As shown in FIG. 17C, it is seen that, when the thickness of the electrode 12 decreases, it becomes difficult for the electrically-conductive fillers to conduct electricity with each other, and thus, the volume resistivity increases. In particular, around the point where the thickness of the electrode 12 becomes slightly smaller than 10 μm, which is close to the size of the filler, the volume resistivity rapidly increases. Further, in accordance with the thickness of the electrode 12 becoming smaller than 10 μm, the degree of increase in the volume resistivity increases. Therefore, in a range where the thickness of the electrode 12 is smaller than 10 μm, the load cannot be appropriately detected due to the above-described factor. Therefore, from the verification result in FIG. 17C, the thickness of the electrode 12 is preferably not less than 10 μm, and the ratio of the thickness of the electrode 12 to the thickness of the base member 11 is preferably not less than 0.02.

Further, with respect to a case of the electrodes 12 having different elastic moduli as well, the inventors conducted an experiment similar to that in FIG. 17B and FIG. 17C to examine the conditions of the ratio and thickness of the electrode 12 for performing appropriate load detection.

Figure 18:
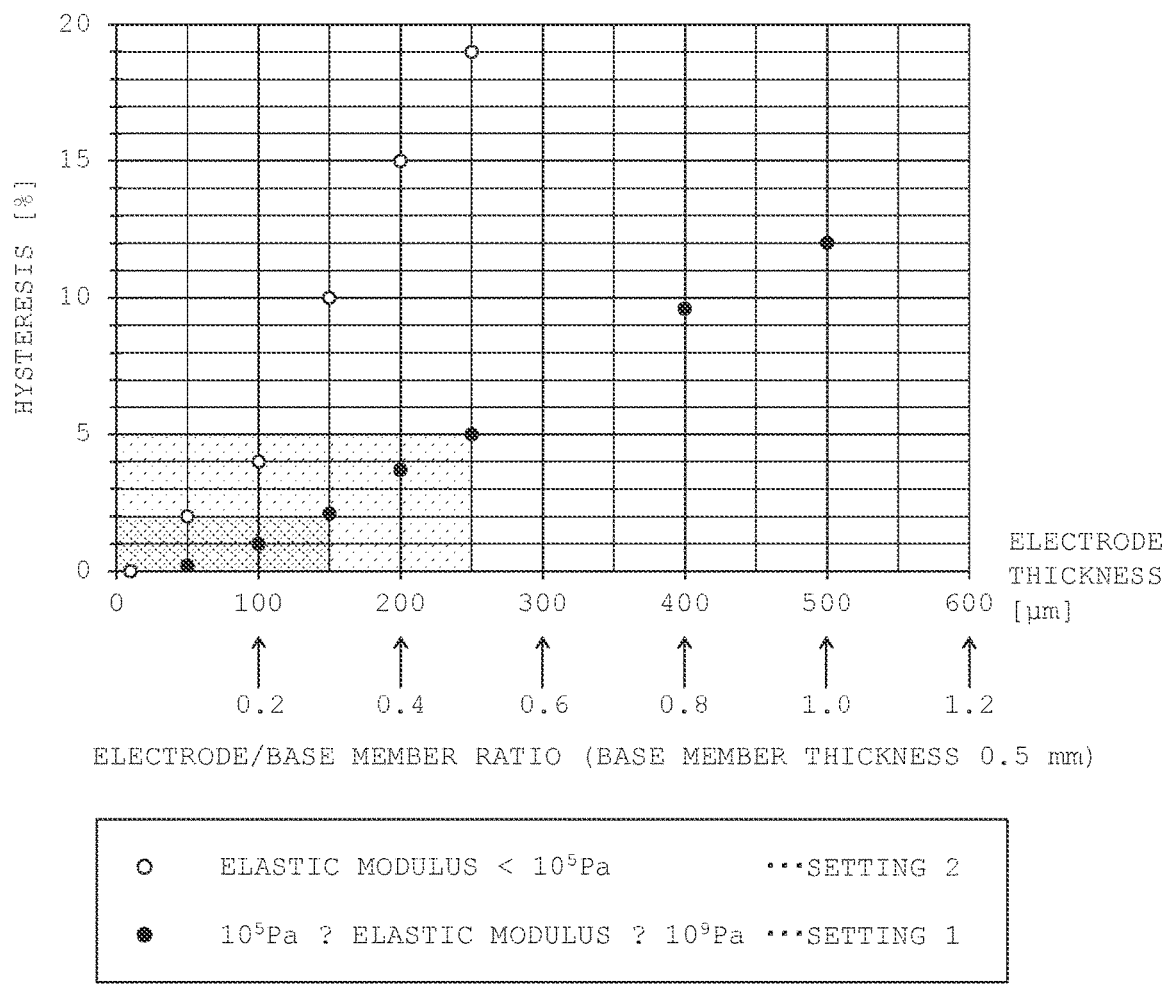
FIG. 18 is a graph showing a relationship between the thickness of electrodes and hysteresis when the elastic moduli of the electrodes are different, according to Embodiment 2.

FIG. 18 is a graph showing a relationship between the thickness of the electrodes 12 and the hysteresis in this experiment. The graph in FIG. 18 is a graph similar to that in FIG. 17B. The black plots indicate a case where an electrode 12 having an elastic modulus of not less than $10^5$ Pa and not greater than $10^9$ Pa (setting 1) was used. The white plots indicate a case where an electrode 12 having an elastic modulus of less than $10^5$ (setting 2) was used. The electrode 12 based on setting 1 is the same as the electrode 12 used in the experiment in FIG. 17B and FIG. 17C. Therefore, the black plots are the same as the plots in FIG. 17B and FIG. 17C.

In the case of setting 1, the condition for causing the hysteresis to be in an allowable range (not greater than 5% or not greater than 2%) and for causing the volume resistivity of the electrode 12 to be in an allowable range (not greater than 75 Ω·cm) is the same as the condition described with reference to FIG. 17B and FIG. 17C. Therefore, a more preferable ratio of the thickness of the electrode 12 to the thickness of the base member 11 in the case of setting 1 is not less than 0.02 and not greater than 0.3.

Meanwhile, in the case of setting 2 as well, an allowable range of the hysteresis that allows appropriate load detection is preferably not greater than 5%, and more preferably not greater than 2%. Therefore, on the basis of the graph in FIG. 18, the thickness of the electrode 12 is preferably not greater than 100 μm, and further preferably, not greater than 50 μm. Therefore, the ratio of the thickness of the electrode 12 to the thickness of the base member 11 is preferably not greater than 0.2, and further preferably not greater than 0.1. In the case of setting 2, the relationship between the thickness and the volume resistivity of the electrode 12 is substantially the same as that in FIG. 17C. Therefore, in the case of setting 2, similar to the case in FIG. 17C, the thickness of the electrode 12 is preferably not less than 10 μm, and the ratio of the thickness of the electrode 12 is preferably not less than 0.02. Therefore, a more preferable ratio of the thickness of the electrode 12 to the thickness of the base member 11 in the case of setting 2 is not less than 0.02 and not greater than 0.1.

The elastic modulus of the electrode 12 used in the load sensor 1 is normally included in a range of not less than $10^5$ Pa and not greater than $10^9$ Pa (setting 1). Therefore, it is preferable that the ratio of the thickness of the electrode 12 to the thickness of the base member 11 is set to be not less than 0.02 and not greater than 0.3, as described above. On the other hand, when the elastic modulus of the electrode 12 used in the load sensor 1 is included in a range of less than $10^5$ (setting 2), the ratio of the thickness of the electrode 12 to the thickness of the base member 11 may be set to be not less than 0.02 and not greater than 0.1, as described above.

Effects of Embodiment 2

According to Embodiment 2, the following effects are exhibited in addition to effects similar to those in Embodiment 1.

As shown in the verification experiment in FIG. 16B, FIG. 17B, and FIG. 17C, when the ratio of the thickness of the electrode 12 to the thickness of the base member 11 is set to be not less than 0.02 and not greater than 0.3, the thickness of the electrode 12 can be made sufficiently smaller than the thickness of the base member 11. Accordingly, in deformations of the electrode 12 and the base member 11 during loading and during unloading, influence of the deformation of the electrode 12 is suppressed, and influence of the deformation of the base member 11 becomes dominant. Therefore, influence of response impairment in elastic return of the electrode 12 can be suppressed, and as a result, changes in capacitance during loading and during unloading can be caused to substantially match each other. Thus, hysteresis can be suppressed. Accordingly, deviation between the detection values of the load sensor 1 during loading and during unloading can be suppressed.

As shown in FIG. 12, the structure 1b has a configuration similar to that of the structure 1a, and the structure 1b is disposed on the upper side of the structure 1a such that each electrode 12 of the structure 1b is superposed on each wire 13 (the wire member 13a). Then, a load is calculated on the basis of the sum of the capacitance between the wire member 13a and the lower electrode 12, and the capacitance between the wire member 13a and the upper electrode 12. Accordingly, the capacitance is enhanced when compared with that in Embodiment 1, and thus, sensitivity of the load sensor 1 can be enhanced. Therefore, the load detection accuracy of the load sensor 1 can be enhanced. In addition, since the upper and lower sides of the wire member 13a are shielded by the electrodes 12, respectively, noise occurring in the wire member 13a can be suppressed.

It is sufficient that, in each of the two structures 1a, 1b, each electrode 12 is an electrode formed by a printing method as described above. The thickness, width, length, and elastic modulus of the electrode 12 and the thickness, elastic modulus, and the like of the base member 11 may be different between the two structures.

Embodiment 3

In Embodiment 2, each wire 13 is disposed so as to linearly extend in the X-axis direction. However, in Embodiment 3, each wire 13 has a shape in which the wire 13 is cyclically bent in the X-Y plane.

FIG. 19 is a perspective view schematically showing a configuration of each part of a load sensor 1 according to Embodiment 3.

Each wire 13 of Embodiment 3 is cyclically bent in advance when compared with that of Embodiment 2. Each wire 13 cyclically bent in this manner is disposed on the upper side of each electrode 12, and is connected to the base member 11 by connection members 14, as in Embodiments 1, 2, whereby a structure 1a is completed. Then, a structure 1b similar to that of Embodiment 2 is set from above the structure 1a, whereby the load sensor 1 is completed.

Each wire 13 of Embodiment 3 is configured to be similar to that of Embodiments 1, 2 above, or may be implemented as a stranded wire obtained by stranding a plurality of insulation-coated conductor wires. In addition, each wire 13 of Embodiments 1, 2 above may be implemented as a stranded wire obtained by stranding a plurality of insulation-coated conductor wires.

Figure 20A:
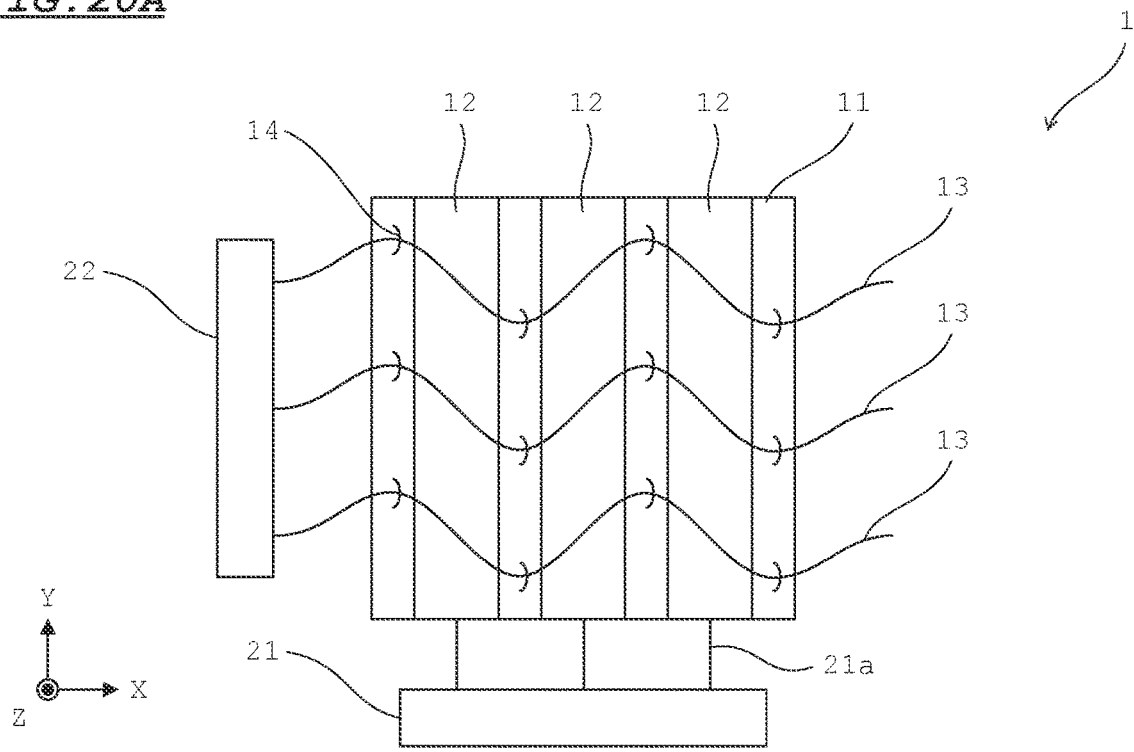
FIG. 20A and FIG. 20B are schematic diagrams indicating that the shape of each wire changes in accordance with stretch and contraction of a base member and electrodes according to Embodiment 3.
Figure 20B:
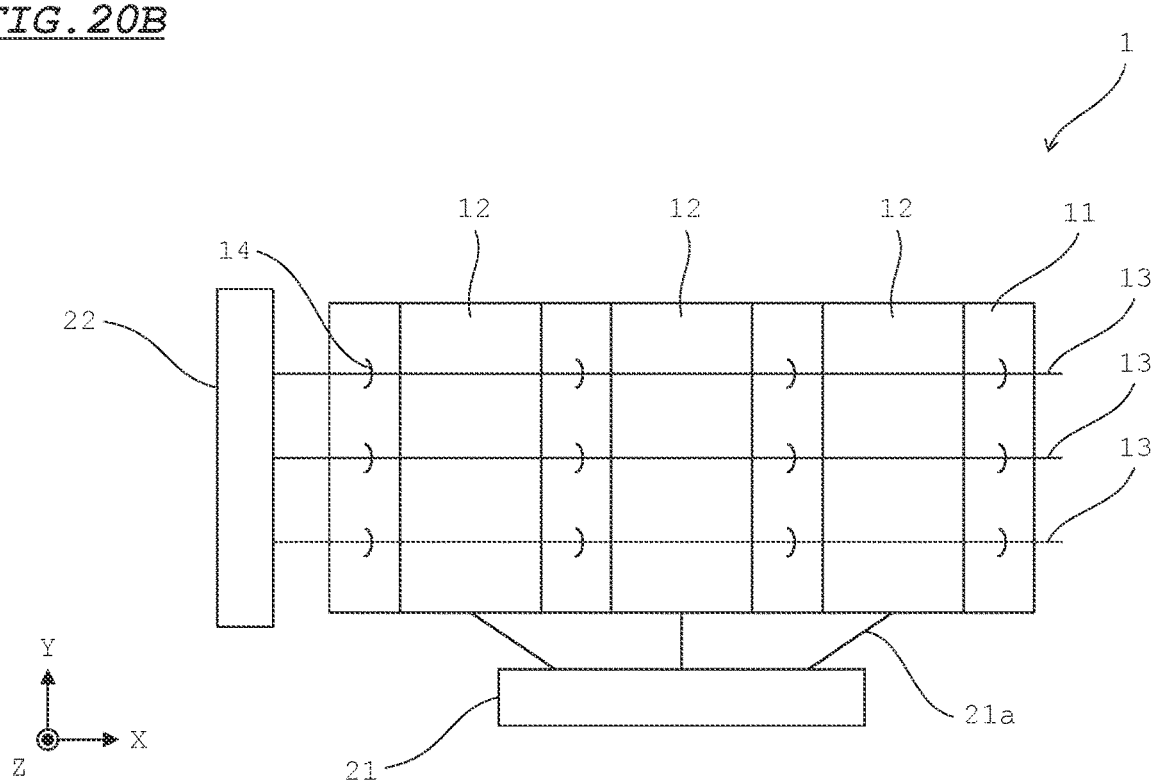

FIG. 20A and FIG. 20B are schematic diagrams indicating that the shape of each wire 13 changes in accordance with stretch and contraction of the base member 11 and the electrodes 12. FIG. 20A and FIG. 20B are each a plan view schematically showing the configuration of the load sensor 1 when viewed in the Z-axis negative direction. For convenience, the structure 1b of the load sensor 1 is not shown.

As shown in FIG. 20A, in a normal state, each wire 13 is cyclically bent, as in FIG. 19. From this state, when the base member 11 and the electrodes 12 stretch and contract, the wires 13 enter a state of being linearly extended as shown in FIG. 20B, for example. At this time, since the connection members 14 are each implemented as a thread, the positions at which the connection members 14 fasten the wires 13 vary in accordance with stretch and contraction of the base member 11 and the electrodes 12.

Effects of Embodiment 3

According to Embodiment 3, the following effects are exhibited in addition to effects similar to those in Embodiments 1, 2.

As shown in FIG. 19 and FIG. 20A, each wire 13 (the wire member 13a) is cyclically bent. Therefore, even if the base member 11 and the electrodes 12 stretch and contract, since the bent state of the wire member 13a changes, breakage of the wire member 13a can be avoided. In addition, when compared with a case where the wire member 13a is linearly disposed, the density of the wire member 13a per unit area is increased. Thus, the detection sensitivity of the load sensor 1 can be enhanced, and the detection range of the load sensor 1 can be enlarged.

Each wire 13 (the wire member 13a) is connected to the base member 11 by connection members 14 so as to be movable in the longitudinal direction (the X-axis direction). Accordingly, as shown in FIG. 20A and FIG. 20B, even if the base member 11 and the electrodes 12 stretch and contract, since the positional relationship between the wire 13 (the wire member 13a) and the connection members 14 changes, breakage of the dielectric body 13b can be inhibited.

<Modification>

Various modifications of the configuration of the load sensor 1 can be made in addition to the configurations shown in Embodiments 1 to 3 above.

For example, in Embodiments 1 to 3 above, three electrodes 12 are formed on a surface of the base member 11. However, one electrode 12 may be formed on the entire surface of the base member 11. In addition, although three wires 13 (the wire members 13a) are disposed with respect to three electrodes 12, the numbers of electrodes 12 and wires 13 are not limited thereto. For example, a plurality of wires 13 (the wire members 13a) extending in the X-axis direction may be disposed so as to be arranged in the Y-axis direction with respect to one electrode 12 extending in the Y-axis direction. Alternatively, the load sensor 1 may be provided with one electrode 12 and one wire 13 only.

In Embodiment 1 above, the base member 15 is set from above the structure shown in FIG. 2A. However, the base member 15 is not necessarily required, and the structure shown in FIG. 2A, as is, may be used as the load sensor 1.

In Embodiments 1 to 3 above, each electrode 12 is formed by using a predetermined printing method. However, the method for forming the electrode 12 is not limited thereto. As long as the electrode 12 that has a thickness sufficiently smaller than that of the base member 11 can be formed, another method may be used in formation of the electrode 12. For example, by injection molding, an electrode 12 having a thickness similar to that obtained by using a printing method described above, may be formed on the base member 11. When the thickness of the base member 11 is large, a sheet-shaped electrode 12 separately formed may be affixed to the base member 11.

In addition to the above, various modifications can be made as appropriate to the embodiments of the present invention without departing from the scope of the technical idea defined by the claims.

What is claimed is:

1. A load sensor comprising:
a base member being insulative and having elasticity;
an electrode having elasticity and formed on an upper face of the base member; and
a wire member being electrically conductive and disposed so as to be superposed on an upper face of the electrode, a surface of the wire member being covered by a dielectric body, wherein
a ratio of a thickness of the electrode to a thickness of the base member is not less than 0.02 and not greater than 0.3.

2. The load sensor according to claim 1, wherein
the electrode is an electrode formed by a predetermined printing method.

3. The load sensor according to claim 2, wherein
the electrode is an electrode formed by screen printing, gravure printing, flexographic printing, offset printing, or gravure offset printing.

4. The load sensor according to claim 1, wherein
a plurality of the electrodes are formed so as to be separated from each other on the upper face of the base member.

5. The load sensor according to claim 4, wherein
each of the electrodes has a band-like shape that is long in one direction, and
the wire member is disposed so as to extend across the plurality of the electrodes.

6. The load sensor according to claim 5, wherein
a plurality of the wire members are disposed along a longitudinal direction of each electrode.

7. The load sensor according to claim 1, wherein
the wire member is cyclically bent.

8. The load sensor according to claim 1, wherein
the wire member is connected to the base member by a connection member so as to be movable in a longitudinal direction of the wire member.

9. The load sensor according to claim 1, wherein
the thickness of the electrode is not greater than 150 μm.

10. The load sensor according to claim 9, wherein
the thickness of the electrode is not less than 10 μm.

11. The load sensor according to claim 1, wherein
the thickness of the base member is not less than 0.5 mm.

12. The load sensor according to claim 11, wherein
the thickness of the base member is 0.5 mm.

13. The load sensor according to claim 1, comprising
another structure that has a configuration similar to that of a structure including the base member and the electrode, wherein
the other structure is disposed such that the electrode of the other structure is superposed on the wire member.

* * * * *